United States Patent
Gray et al.

(10) Patent No.: US 6,168,077 B1
(45) Date of Patent: Jan. 2, 2001

(54) APPARATUS AND METHOD OF PROVIDING A DUAL MODE CARD AND READER

(75) Inventors: Robert J. Gray, Costa Mesa; Lee Gudmundsen, Santa Ana; Charles E. Frasier, San Dimas, all of CA (US)

(73) Assignee: Litronic, Inc., Irvine, CA (US)

(*) Notice: Under 35 U.S.C. 154(b), the term of this patent shall be extended for 0 days.

(21) Appl. No.: 09/176,267

(22) Filed: Oct. 21, 1998

(51) Int. Cl.⁷ ...................................................... G06F 17/00
(52) U.S. Cl. .......................................... 235/375; 235/380
(58) Field of Search .................................. 235/375, 380, 235/487, 492, 493; 900/25, 26, 27

(56) References Cited

U.S. PATENT DOCUMENTS

| | | | |
|---|---|---|---|
| 4,767,920 | * 8/1988 | Kitta et al. | 235/492 |
| 4,795,898 | * 1/1989 | Bernstein et al. | 235/487 |
| 4,799,891 | 1/1989 | Reichardt et al. | 493/43 |
| 4,961,142 | * 10/1990 | Elliot et al. | 364/408 |
| 5,349,649 | 9/1994 | Iijima | 395/275 |
| 5,420,412 | 5/1995 | Kowalski | 235/492 |
| 5,451,763 | * 9/1995 | Pickett et al. | 235/492 |
| 5,581,708 | 12/1996 | Iijima | 395/200.14 |
| 5,594,233 | 1/1997 | Kenneth et al. | 235/492 |
| 5,619,683 | 4/1997 | Kreft | 395/500 |
| 5,630,170 | 5/1997 | Koizumi . | |
| 5,634,132 | * 5/1997 | Pearce et al. | 395/750 |
| 5,651,116 | 7/1997 | Le Roux | 395/200.14 |
| 5,675,813 | 10/1997 | Holmdahl | 395/750 |
| 5,679,945 | 10/1997 | Renner et al. | 235/492 |
| 5,712,472 | 1/1998 | Lee . | |
| 5,715,477 | 2/1998 | Kikinis | 395/888 |
| 5,748,737 | 5/1998 | Daggar | 380/24 |
| 5,754,227 | * 5/1998 | Fukuoka | 348/232 |
| 5,777,903 | * 7/1998 | Piosenka et al. | 364/700 |
| 5,787,101 | * 7/1998 | Kelly | 371/49.1 |

FOREIGN PATENT DOCUMENTS

| | | |
|---|---|---|
| 0 513 507 A1 | 11/1992 | (EP) . |
| 0 660 241 A2 | 6/1995 | (EP) . |
| WO 95/24019 | 9/1995 | (WO) . |

\* cited by examiner

*Primary Examiner*—Karl D. Frech
(74) *Attorney, Agent, or Firm*—Irell & Manella LLP

(57) ABSTRACT

One aspect of the present invention is a method and apparatus of providing a card and/or reader that recognizes a communication mode of a corresponding reader and/or card. The card reader comprises a memory and a card interface circuit to detect a mode of a card. A processor coupled to the card interface circuit and the memory, communicates with the card in the detected mode if the detected mode matches a communication mode of the processor. The card comprises a memory and a reader interface circuit to detect a mode of a reader. A processor coupled to the reader interface circuit and the memory, communicates with the reader in the detected mode if the detected mode matches a communication mode of the processor. Another aspect of the present invention is a method and apparatus of providing a card and/or reader that is operable in two communication modes. The dual mode card reader comprises a memory and a card interface circuit to detect a mode of a card, the mode being one of first and second communication modes. A processor coupled to the card interface circuit and the memory, communicates with the card in the detected mode. The dual mode card comprises a memory and a reader interface circuit to detect a mode of a reader, the mode being one of first and second communication modes. A processor coupled to the card interface circuit and the memory, communicates with the reader in the detected mode.

17 Claims, 15 Drawing Sheets

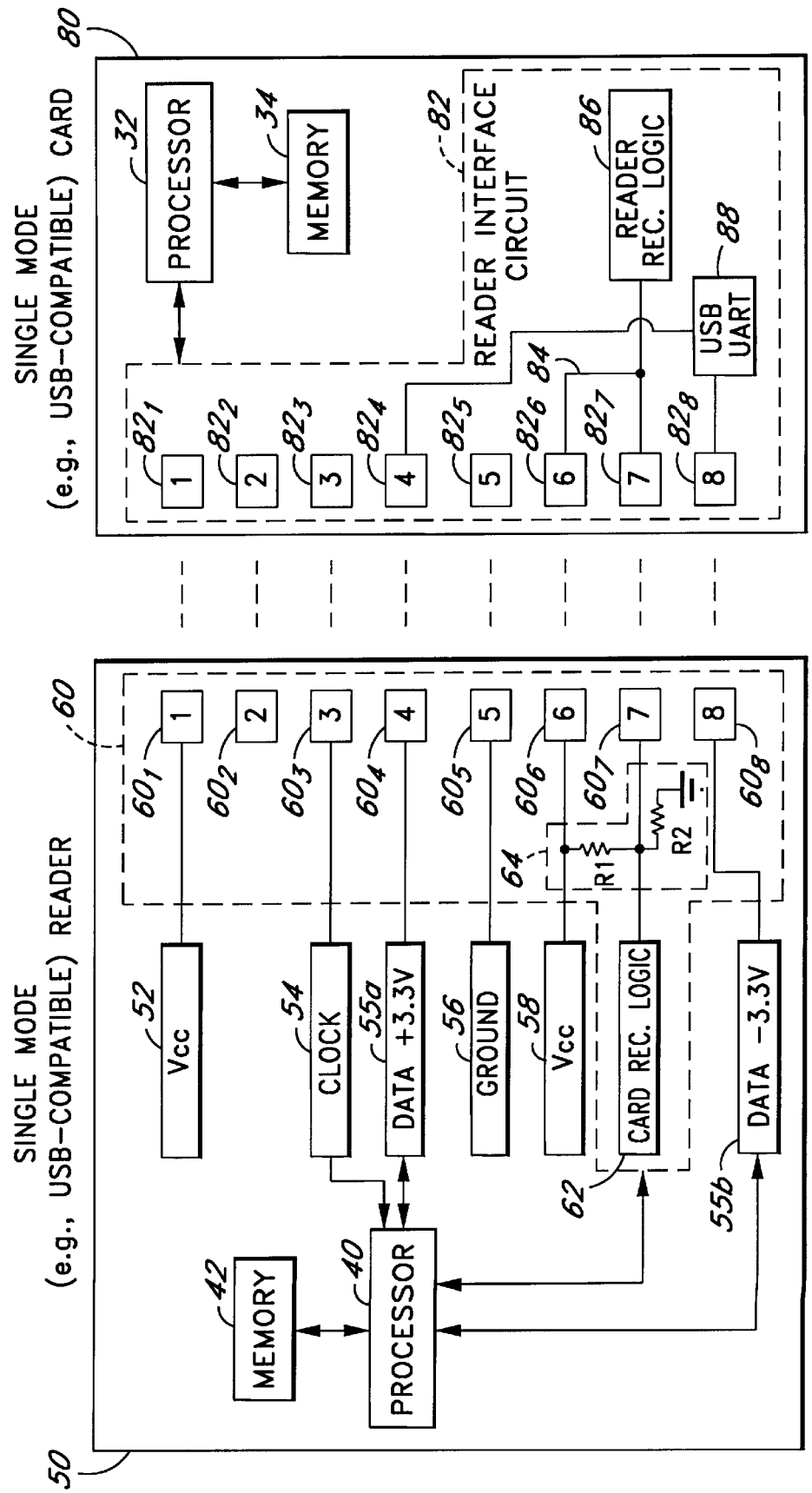

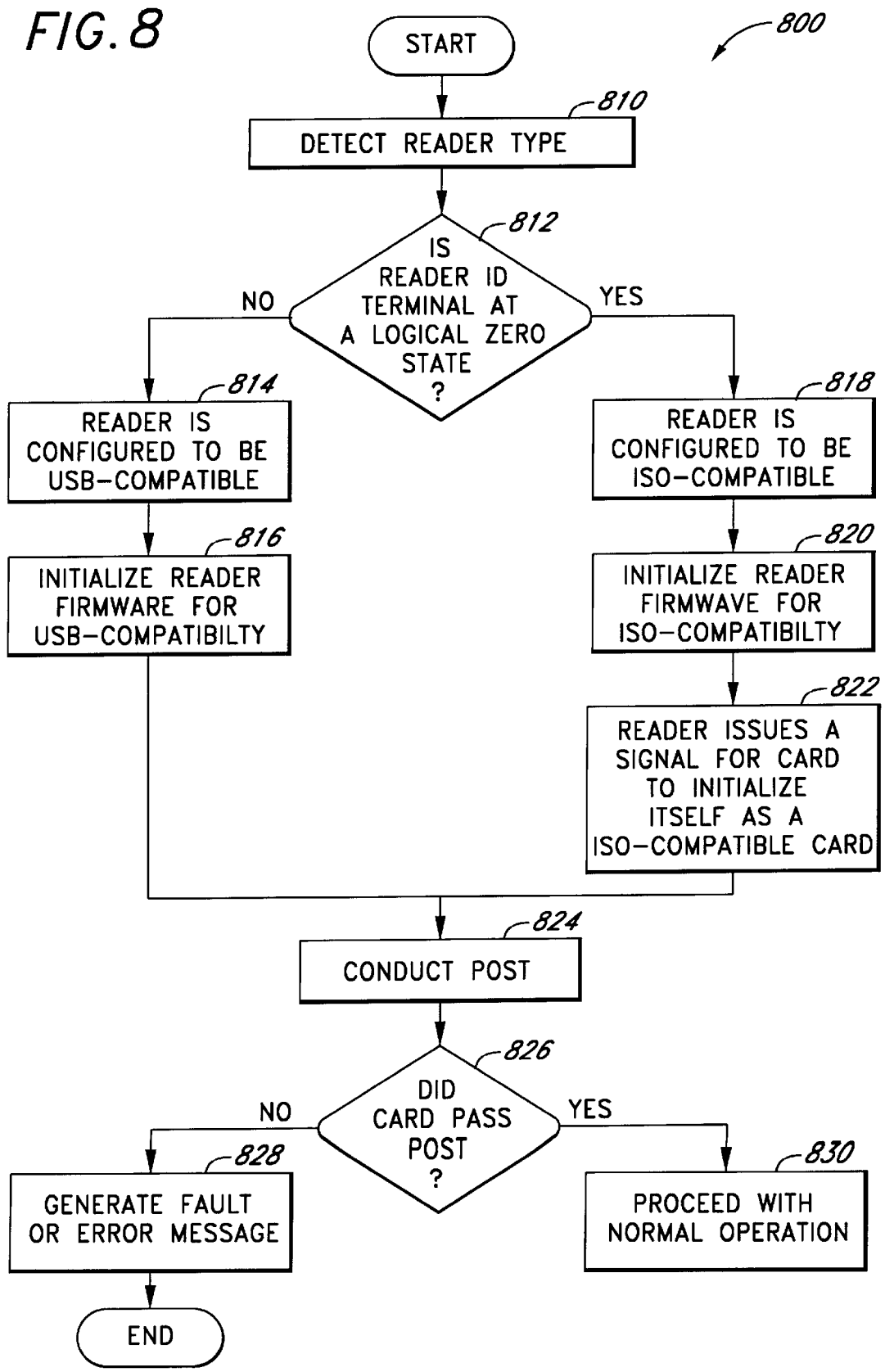

APPARATUS AND METHOD OF PROVIDING A DUAL MODE CARD AND READER

BACKGROUND OF THE INVENTION

1. Field of the Invention

The present invention relates to electronic devices, and more particularly to a method and apparatus of providing a card and/or reader that recognizes a communication mode of a corresponding reader and/or card. The present invention also relates to a method and apparatus of providing a card and/or reader that is operable in two communication modes.

2. Description of the Related Art

Currently, most smart cards interface with card readers in a manner compliant with the International Standards Organization/International Electrotechnical Commission (ISO) 7816 standard (hereinafter "ISO-7816 standard"). Card readers in turn communicate with host computers using interfaces such as the RS-232, the PS/2 or the Universal Serial Bus (USB). Current host computers typically require the implementation and utilization of a specific driver such as the RS 232, the PS/2 or the USB driver, to communicate with the card readers. The card reader in turn communicates with the card in accordance with ISO-7816.

Although the ISO-7816 is a well established standard, communication based on this standard is rather slow. In addition, the implementation of USB is becoming more prevalent on newer computers. As a result, it has become desirable to develop smartcards that can operate and communicate at higher speeds. It is also desirable to provide smart cards that can communicate directly with host computers, over, for example, the USB, at very high speeds.

Accordingly, there is a need in the technology for a card and/or a card reader interface that is functionally compatible with both the ISO-7816 and the USB standards. There is also a need in the technology for a card and a reader that communicates in accordance with either or both of those standards, and can distinguish the operational mode of the respective reader or card that it interfaces with.

BRIEF SUMMARY OF THE INVENTION

One aspect of the present invention is a method and apparatus of providing a card and/or reader that recognizes a communication mode of a corresponding reader and/or card. The card reader comprises a memory and a card interface circuit to detect a mode of a card. A processor coupled to the card interface circuit and the memory, communicates with the card in the detected mode if the detected mode matches a communication mode of the processor. The card comprises a memory and a reader interface circuit to detect a mode of a reader. A processor coupled to the reader interface circuit and the memory, communicates with the reader in the detected mode if the detected mode matches a communication mode of the processor. Another aspect of the present invention is a method and apparatus of providing a card and/or reader that is operable in two communication modes. The dual mode card reader comprises a memory and a card interface circuit to detect a mode of a card, the mode being one of first and second communication modes. A processor coupled to the card interface circuit and the memory, communicates with the card in the detected mode. The dual mode card comprises a memory and a reader interface circuit to detect a mode of a reader, the mode being one of first and second communication modes. A processor coupled to the card interface circuit and the memory, communicates with the reader in the detected mode.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2A is a block diagram of one embodiment of a single mode (e.g., USB-compatible) reader that is used in conjunction with one embodiment of a single mode (e.g., USB-compatible) card.

FIG. 8 is a flow chart illustrating one embodiment of the reader identification process of the dual mode card in accordance with one embodiment of the present invention.

DETAILED DESCRIPTION OF THE INVENTION

One aspect of the invention involves a card reader that recognizes the communication mode of a card that it receives. In one embodiment, the card reader is configured, to operate in accordance with the USB standard. This card reader recognizes cards that conform to the USB standard. Once communication is established, the card reader becomes transparent to both the card and the host computer, resulting in providing accelerated communication between the two entities. In this configuration, the unused ISO portion of the connector on the smart card are used to communicate with the USB reader for purposes of activating the LED(s) on the reader, input optional keypad PIN entries, and/or input optional biometric (e.g., fingerprint scan) information about the user.

A second aspect of the invention involves a card reader that provides dual mode communication with a smart card. In one embodiment, this aspect of the invention involves a card reader that operates in accordance with either the ISO-7816 or the USB standard. The card reader of the invention can receive a smart card that communicates in accordance with either of those standards, and can distinguish the operational mode of the card it receives. Once the operational mode of the card is established, the card reader communicates with the card in a mode that is compatible with that of the card.

A third aspect of the invention involves an apparatus and method for providing dual mode communication for a smart card. In one embodiment, this aspect of the invention involves the implementation of a smart card that can operate in accordance with either the ISO-7816 or the USB standards. The smart card of the invention is able to distinguish a card reader that is capable of communicating in accordance with either of the standards, and accordingly provides communication in a mode that is compatible with the reader.

Although the present invention is described with reference to the ISO-7816 and the USB standards, in alternate embodiments, dual and/or single mode communication based other communication standards and/or protocols, or operational standards and/or modes may be provided in accordance with the principles of the invention. Such other communication standards and/or protocols include, but are not limited to IEEE 1394 serial bus (firewire) and RS-232. In addition, in alternate embodiments, detection and/or identification of other communication standards and/or protocols, or operational standards and/or modes of a reader or card may be provided in accordance with the principles of the invention. Reference to the ISO-7816 and USB standards are used for illustrative purposes only and are by no means restrictive.

Figure 1A:
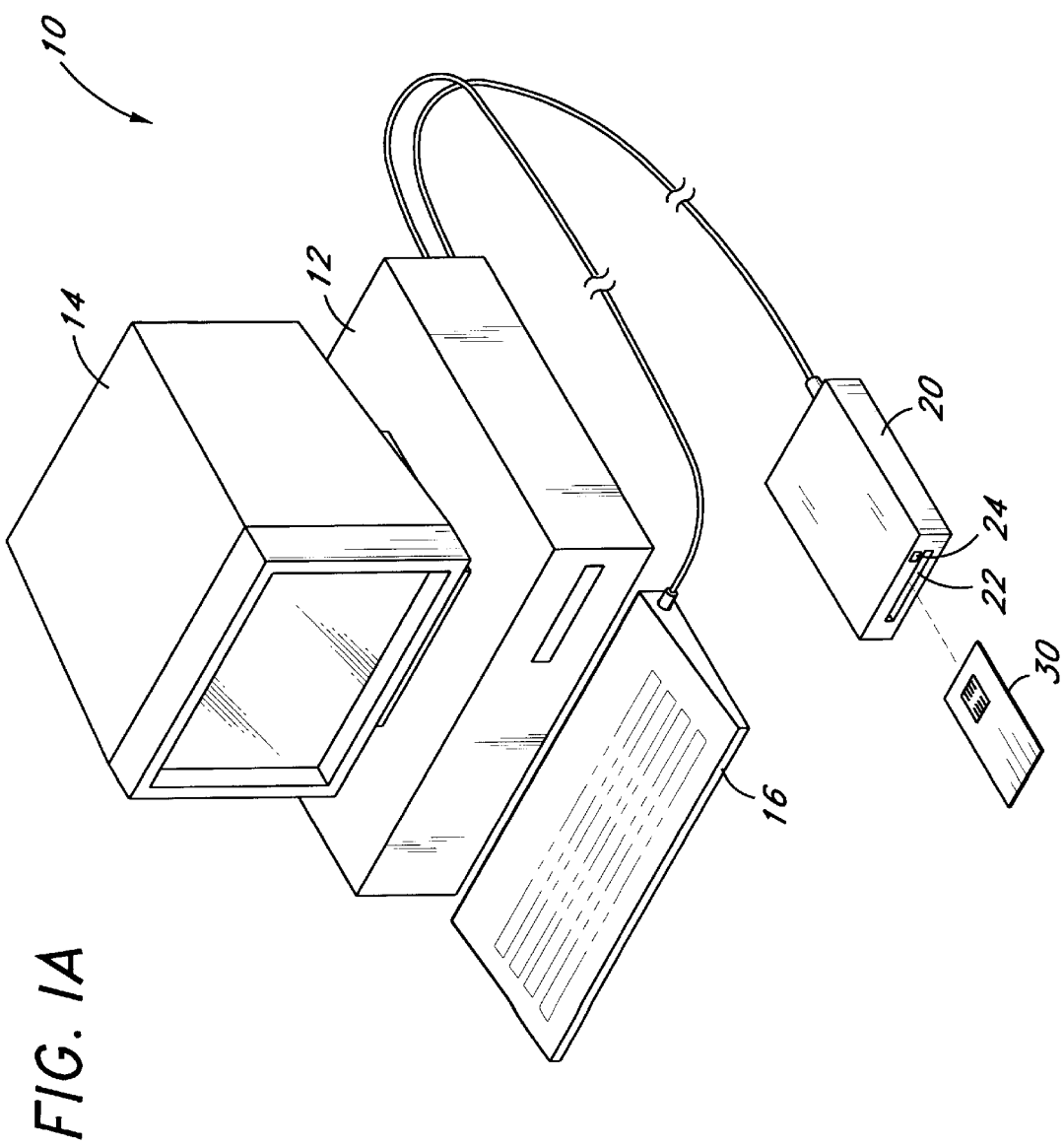
FIG. 1A is a perspective view of one embodiment of an electronic system that implements one embodiment of the present invention.

FIG. 1A is a perspective view of one embodiment of an electronic system that implements one embodiment of the present invention. The electronic system 10 comprises a computer 12, a monitor 14, a keyboard 16, and a card reader 20. The computer 12 may be a general purpose computer, a personal computer or a workstation. The computer 12 may also be connected to a network (not shown). The keyboard 16 is coupled to the computer 12, which supplies current and voltage to the keyboard 16 and the card reader 20. In an alternate embodiment, the keyboard 16 may be coupled to the computer. 12 via an adapter which is also coupled to the card reader 20. In this embodiment, the keyboard 16 only communicates with the computer 12 via the card reader 20. One example of such an arrangement is described in U.S. application Ser. No. 081744,363 filed Nov. 7, 1996, entitled "Method and Apparatus for providing an Authentication System," which is assigned to the assignee of the present invention and is incorporated herein by reference.

The card reader 20 has a slot 22 which receives a card 30, such as a smartcard. The card 30 comprises a processor and a memory module (see FIG. 1B). In one embodiment, the reader 20 also has a light emitting diode (LED) 24 which is turned on to indicate that the card reader 20 is ready to accept information from the keyboard 16 and that any information thus communicated will not be provided to the computer 12. In an alternate embodiment, the reader 20 may be configured to include a biometric sensor or scanner such as that described in co-pending U.S. patent application Ser. No. 09/153,668 filed Sep. 15, 1998, entitled "Apparatus and Method for providing an Authentication System based on Biometrics," which is assigned to the assignee of the present invention, and is incorporated herein by reference. In other alternate embodiments, the reader 20 also includes a keypad, an alarm and additional LEDs which are configured to indicate other communications activities and card input/output changes.

Figure 1B:
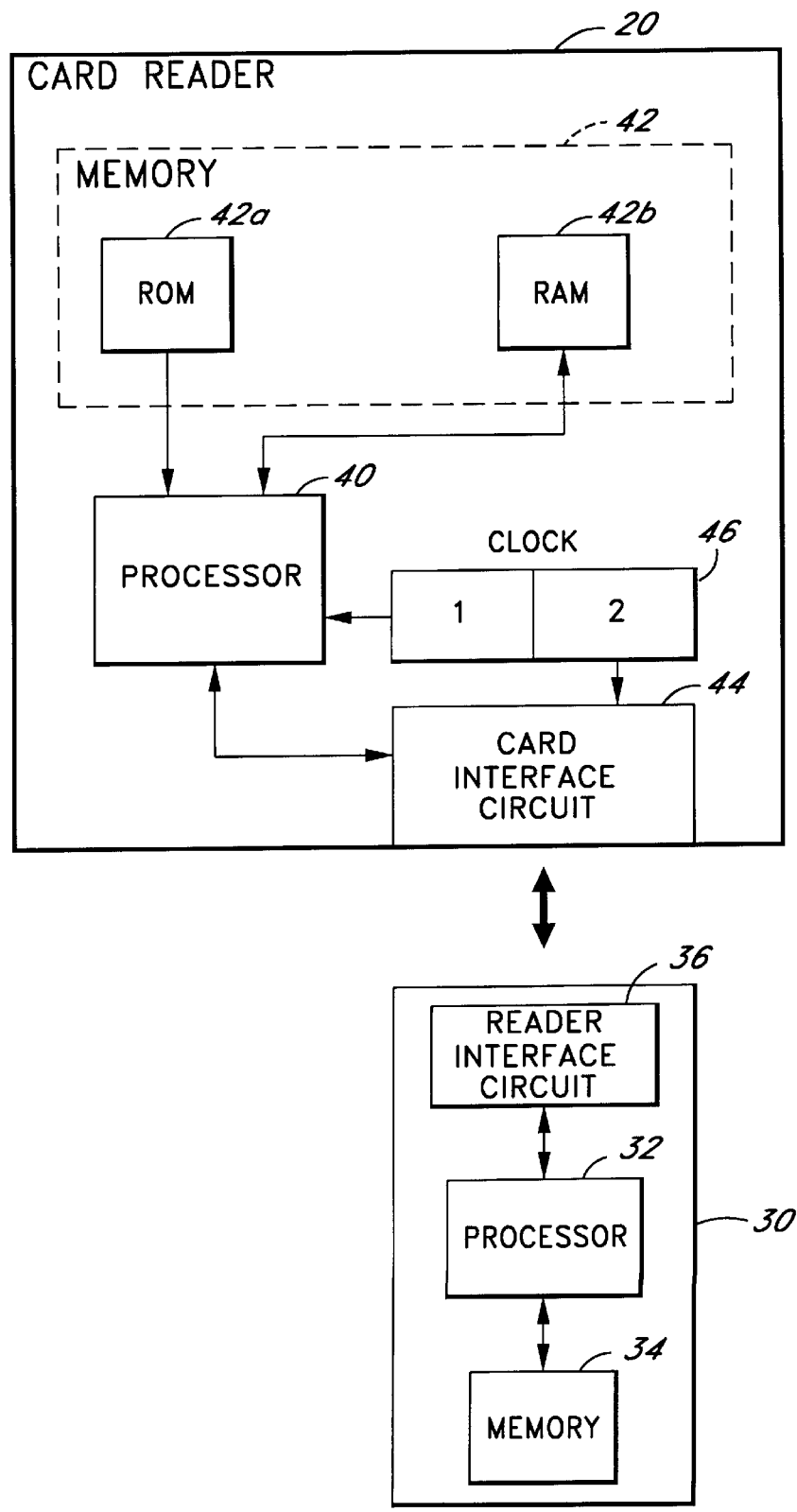
FIG. 1B is a block diagram of one embodiment of the card reader 20 and one embodiment of the card 30 as shown in FIG. 1A.

FIG. 1B is a block diagram of one embodiment of the card reader 20 and one embodiment of the card 30 as shown in FIG. 1A. The card reader 20 comprises a processor 40 and a memory module 42 which includes both read only memory (ROM) 42a and random access memory (RAM) 42b. The memory module 42 may also include magnetic disk storage mediums, optical storage mediums, flash memory devices and/or other machine readable mediums. The card reader 20 further comprises a card reader/writer interface circuit (card interface circuit) 44 which receives the card 30 through a slot 22 (see FIG. 1A). The card interface circuit 44 also reads and/or writes data to or from the card 30. A clock module 46 provides timing signals for the operation of the processor 40 and the card interface circuit 44. In one embodiment, the clock module 46 comprises a single clock which provides timing signals for both the processor 40 and the operation of the card interface circuit 44. In another embodiment, the clock module 46 comprises two clocks, one for driving the processor 40 and the other for driving the operation of the card interface circuit 44.

ROM 42a includes firmware which the processor 40 executes for operation of the card reader 20 and for monitoring data and/or commands from the computer 12. In one embodiment, ROM 42a also includes firmware for monitoring data entered from the keyboard 16 or from a keypad (not shown) mounted on the reader 20. This firmware performs read/write operations to/from the card 30 and the read/write operations to/from RAM 42b, where RAM 42b is used as a temporary buffer for data inputs and outputs. In alternate embodiments, ROM 42a also includes firmware for: generating random numbers, for implementing encryption processes (such as encryption processes performed in accordance with the Data Encryption Standard (DES), Skipjack Standard and Rivest Shamir Aldeman (RSA) Standard), for providing key exchange (such as those provided in accordance with the Key Exchange Algorithm (KEA), the Diffie-Hellman key agreement, and the RSA standard), for providing hashing operations (such as those provided in accordance with the Secure Hash Algorithm SHA-1, the American National Standard Institute (ANSI) 9.9 standard and Maximum Distance Separable (MDS) codes) and for providing digital signatures (such as those provided in accordance with the Digital Signature Algorithm (DSA) and the RSA standard). In one embodiment, the card reader 20 further comprises a light emitting diode (LED) 24 (see FIG. 1A), which operates under control of the processor 40 to indicate that an access authorization procedure has been initiated, and that the communication path between the card reader 20 (and thus the keyboard 16) and the computer 12 has been temporarily terminated. The LED 24 provides visual indication to the keyboard operator as to when it is secure to enter his password, so that the password will not be inadvertently provided to the computer 12.

In one embodiment, the card interface circuit 44 detects and identifies the communication mode of the card 30. The card interface circuit 44 subsequently provides communication with the card 30 in the detected mode. In another embodiment, the card interface circuit 44 communicates in one of two communication modes with the card 30, in accordance with the detected communication mode of the card 30.

The card 30 comprises a processor 32, a memory 34 and a reader interface circuit 36. The memory 34 may include read only memory (ROM), random access memory (RAM), magnetic disk storage mediums, optical storage mediums, flash memory devices and/or other machine readable mediums. In one embodiment, memory 34 also includes firmware for: generating random numbers, for implementing encryption processes (such as encryption processes performed in accordance with the Data Encryption Standard (DES), Skipjack Standard and Rivest Shamir Aldeman (RSA) Standard), for providing key exchange (such as those provided in accordance with the Key Exchange Algorithm (KEA), the Diffie-Hellman key agreement, and the RSA standard), for providing hashing operations (such as those provided in accordance with the Secure Hash Algorithm SHA-1, the American National Standard Institute (ANSI) 9.9 standard and Maximum Distance Separable (MDS) codes) and for providing digital signatures (such as those provided in accordance with the Digital Signature Algorithm (DSA) and the RSA standard). The reader interface circuit 36 includes a plurality of terminals (see for example, the contact terminals $80_1$–$80_8$ of the reader interface circuit 82 as shown in FIG. 2A) that interface with a corresponding plurality of terminals in the card interface circuit 44 of the card reader 20 (see, for example, the terminals $60_1$–$60_8$ of the card interface circuit 60 of reader 50 as shown in FIG. 2A) when the card 30 is inserted into the slot 22 of the reader 20. In one embodiment, the reader interface circuit 36 detects and identifies the communication mode of the reader 20. The reader interface circuit 36 subsequently provides communication with the reader 20 in the detected mode. In another embodiment, the reader interface circuit 36 communicates in one of two communication modes with the reader 20, in accordance with the detected communication mode of the reader 20.

FIG. 2A is a block diagram of one embodiment of single mode reader 50 that is used in conjunction with one embodiment of a single mode card 80. The single mode reader 50 may be used in place of the reader 20 in FIGS. 1A and 1B, while the single mode card 80 may be used in place of the card 30 of FIGS. 1A and 1B. In one embodiment, the single mode reader 50 is a USB-compatible reader, and the single mode card is a USB-compatible card. The single mode (e.g., USB-compatible) reader 50 receives the single mode (e.g., USB-compatible) card 80 through a slot (not shown) similar to the slot 22 on reader 20 of FIG. 1A. Like the card reader 20, the single mode reader 50 comprises a processor 40, a memory module 44, a clock module 54 and a card interface circuit 60. The processor 40, memory module 44, and clock module 54 of the single mode reader 50 may be similar or identical to those of reader 20 in FIGS. 1A and 1B.

As shown in FIG. 2A, the card interface circuit 60 of reader 50 comprises a plurality of terminals $60_1$–$60_8$, a card recognition logic circuit 62 and a divider circuit 64. In one embodiment, the divider circuit 64 comprises two resistors R1 and R2. In one further embodiment, the resistance value of R1 is approximately ten times the resistance value of R2. For example, R1=100 Kohm and R2=10 Kohm. The plurality of terminals $60_1$–$60_8$ are configured to interface with a corresponding plurality of terminals $82_1$–$82_8$ located in the reader interface circuit 82 of the card 80. In one embodiment, upon insertion of the card 80 into the slot of the reader 50, the first through eighth terminals $60_1$–$60_8$ of the reader 50 interface with the first through eighth terminals $82_1$–$82_8$ of the card 80, respectively. In one embodiment, the plurality of terminals $60_1$–$60_8$ and the plurality of terminals $82_1$–$82_8$ are contact terminals.

The single mode reader 50 further comprises a first voltage circuit 52, a first data circuit 55a, a second data circuit 55b, a ground terminal 56, and a second voltage circuit Vcc 58. In one embodiment, the first voltage circuit 52 provides a fixed voltage Vcc of 5 volts to the first terminal $60_1$. In one embodiment, the terminal $60_2$ of the reader 50, is not coupled to any circuitry. The clock circuit 54 provides clock signals to the processor 40 and to the card 80 via the third terminal $60_3$. The first and second data circuits 55a and 55b are coupled to both the processor 40 and to the fourth and eighth terminals $60_4$ and $60_8$ respectively. The first and second data circuits 55a and 55b receive and forward data via the fourth and eighth terminals $60_4$ and $60_8$. In particular, data is provided as a differential signal from (or to) card 80 via elements $82_4$ and $82_8$ (from USB Universal Asynchronous Receive/Transmit (UART) Circuit 88) to (or from) reader 50, which receives (or forwards) the differential signal via terminals $60_4$ and $60_8$. The USB UART 88 facilitates communication with a USB compatible reader, such as reader 50. The ground circuit 56 provides grounding via the fifth terminal $60_5$, while the second voltage circuit 58 provides a fixed voltage Vcc that is provided via a sixth terminal $60_6$. In one embodiment, the first and second voltage circuits 52 and 58 are a single voltage circuit. The card recognition logic circuit 62 is coupled to the seventh terminal $60_7$. In addition, the divider circuit 64 is coupled to the second voltage circuit 58, the card recognition circuit 62, and the sixth and seventh terminals $60_6$ and $60_7$. In particular, the first resistor R1 is coupled between the sixth and seventh terminals $60_6$ and $60_7$, while one end of the second resistor R2 is coupled to the seventh terminal $60_7$, and a second end of R2 is coupled to ground.

The card 80 comprises a processor 32 that is coupled to a memory module 34 and a reader interface circuit 82. The reader interface circuit 82 comprises a plurality of terminals $82_1$–$82_8$. The terminals $82_1$–$82_3$ and $82_5$ are coupled to various circuitry within the card 80 which are known to one of skill in the art, but are not pertinent to the understanding of the present invention. The terminals $82_4$ and $82_8$ are coupled to a USB UART 88. The terminal $82_6$ on the card 80, which is typically not used, is coupled to the seventh element $82_7$ on the card 80 via a signal line 84, in accordance with the principles of the present invention. A reader recognition logic circuit 86 is coupled to the sixth and seventh terminals $82_6$ and $822_7$.

Upon receiving the single mode card 80, the first through eighth terminals $82_1$–$82_8$ of the card 80 contact the respective first through eighth terminals $60_1$–$60_8$ of the reader 50. In particular, the sixth and seventh $60_6$ and $60_7$ of the reader 50 respectively, so that the signal line 84 coupled between the sixth and seventh terminal $82_6$ and $82_7$ of the card 80 creates a short between the sixth and seventh terminals $60_6$ and $60_7$ of the reader 50. As a result, the seventh terminal $60_7$ of the reader 50 is pulled up to Vcc. The card recognition logic circuit 62 in the single mode reader 50 subsequently detects that the voltage at the seventh terminal $60_7$ of the reader 50 has been pulled up to Vcc (typically 5V) or, is at a logic one state, and accordingly detects that the inserted card operates in accordance with a first predetermined communication mode. In one embodiment, when card recognition logic circuit 62 detects that the seventh terminal $60_7$ is at a logic one state, it determines that the card 80 is USB-compatible, i.e., the first predetermined communication mode is the USB mode. The reader 50 then proceeds with normal operation, including entering a passive mode to enable the card 80 to communicate directly with a host computer, such as computer 12 (FIG. 1A). Conversely, if the reader 50 detects that the seventh terminal $60_7$ is not at a logic one state, it determines that the card 80 is not USB-compatible. In this case, the reader 50 generates a fault or an error message, which is received by the computer 12 and displayed on the monitor 14.

Likewise, the reader recognition logic circuit 84 in the single mode card 80 detects that the reader 50 operates in accordance with the predetermined communication mode (e.g., is USB compatible), by detecting a logic one at terminal $82_7$. The card 80 then proceeds with normal operation, and communicates directly with the host computer, such as computer 12, after the reader 50 enters a passive mode. Conversely, if the card 80 determines that the reader 50 is not USB-compatible, by detecting a logic zero state at the seventh terminal $82_7$, it generates a fault or an error message, which is transmitted to the computer 12 via reader 50.

Figure 2B:
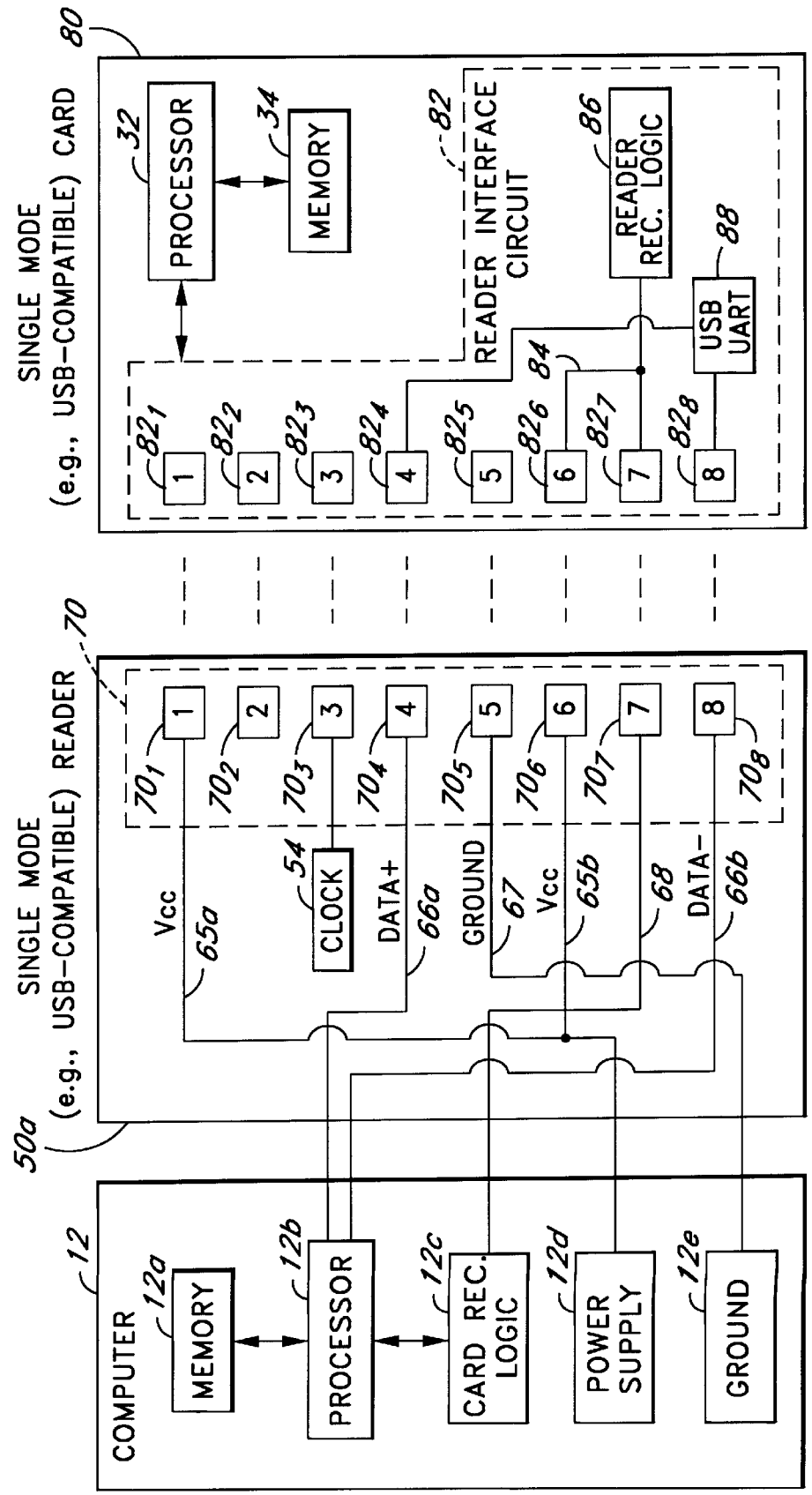
FIG. 2B is a block diagram of a second embodiment of a single mode (e.g., USB-compatible) reader that is used in conjunction with one embodiment of a single mode (e.g., USB-compatible) card.

FIG. 2B is a block diagram of a second embodiment of a single mode reader that is used in conjunction with one embodiment of a single mode card. The single mode reader 50a may be used in place of the reader 20 in FIGS. 1A and 1B, while the single mode card 80 may be used in place of the card 30 of FIGS. 1A and 1B. In one embodiment, the single mode reader 50a is a USB-compatible reader, and the single mode card is a USB-compatible card. In this embodiment, the reader 50a comprises a clock module 54 and a card interface circuit 70 that includes a plurality of terminals $70_1$–$70_8$. The reader 50a is coupled to a computer 12 that comprises a memory 12a, a processor 12b, a card recognition logic circuit 12c, a power supply 12d and a ground circuit 12e. In the embodiment of FIG. 2B, the reader 50a facilitates recognition of the card 80 by the computer 12. In particular, the reader 50a operates under the control of the processor 12b, and receives its voltage and current requirements from the power supply 12d. The reader 50a further receives grounding from the ground circuit 12e.

In addition to the clock circuit 54 and the card interface circuit 70, the single mode reader 50a further comprises a first and a second signal lines 65a and 65b that respectively couple the first and the sixth terminals $70_1$ and $70_6$ to the power supply 12d; a third and a fourth signal lines 66a and 66b that respectively couple the fourth and the eighth terminals $70_4$ and $70_8$ to the processor 12b; a fifth signal line that couples the fifth terminal $70_5$ to the ground circuit 12e; and a sixth signal line 68 that couples the seventh terminal $70_7$ to the card recognition logic circuit 12c. In one embodiment, the power supply 12d provides a fixed voltage Vcc of 5 volts to the first and sixth terminals $70_1$ and $70_6$. In one embodiment, the terminal $70_2$ of the reader 50a is not coupled to any circuitry. The clock circuit 54 provides clock signals to the reader 70 and to the card 80 via the third terminal $70_3$. The second and third signal lines 66a and 66b receive and forward data via the fourth and eighth terminals $70_4$ and $70_8$, and provide bi-directional communications between the processor 12b of the computer and the processor 32 of the card 80. In particular, data is provided as a differential signal from (or to) card 80 via elements $82_4$ and $82_8$ (from USB UART 88) to (or from) reader 50a, which receives (or forwards) the differential signal via terminals $70_4$ and $70_8$. The ground circuit 12e provides grounding via the fifth terminal $70_5$. The card recognition logic circuit 12c is coupled to the seventh terminal $70_7$.

Upon receiving the single mode card 80, the first through eighth terminals $82_1$–$82_8$ of the card 80 contact the respective first through eighth terminals $70_1$–$70_8$ of the reader 50a. In particular, the sixth and seventh terminals $82_6$ and $82_7$ of the card 80 contact the sixth and seventh terminals $70_6$ and $70_7$ of the reader 50a respectively, so that the signal line 84 coupled between the sixth and seventh terminal $82_6$ and $82_7$ of the card 80 creates a short between the sixth and seventh terminals $70_6$ and $70_7$ of the reader 50a. As a result, the seventh terminal $70_7$ of the reader 50a is pulled up to Vcc. The card recognition logic circuit 12c in the computer 12 subsequently detects that the voltage at the seventh terminal $70_7$ of the reader 50a has been pulled up to Vcc (typically 5V) or, is at a logic one state, and accordingly detects that the inserted card operates in accordance with a first predetermined communication mode. In one embodiment, when card recognition logic circuit 12c detects that the seventh terminal $70_7$ is at a logic one state, it determines that the card 80 is USB-compatible, i.e., the first predetermined communication mode is the USB mode. The reader 50a then proceeds with normal operation, including entering a passive mode to enable the card 80 to communicate directly with the processor 12b in computer 12. Conversely, if the reader 50a detects that the seventh terminal $70_7$ is not at a logic one state, it determines that the card 80 is not USB-compatible. In this case, the reader 50a generates a fault or an error message, which is received by the computer 12 and displayed on the monitor 14.

Likewise, the reader recognition logic circuit 86 in the single mode card 80 detects that the reader 50a operates in accordance with the predetermined communication mode (e.g., is USB compatible), by detecting a logic one at terminal $82_7$. The card 80 then proceeds with normal operation, and communicates directly with the host computer, such as computer 12. Conversely, if the card 80 determines that the reader 50a is not USB-compatible, by detecting a logic zero state at the seventh terminal $82_7$, it generates a fault or an error message, which is transmitted to the computer 12 via reader 50a.

Figure 3A:
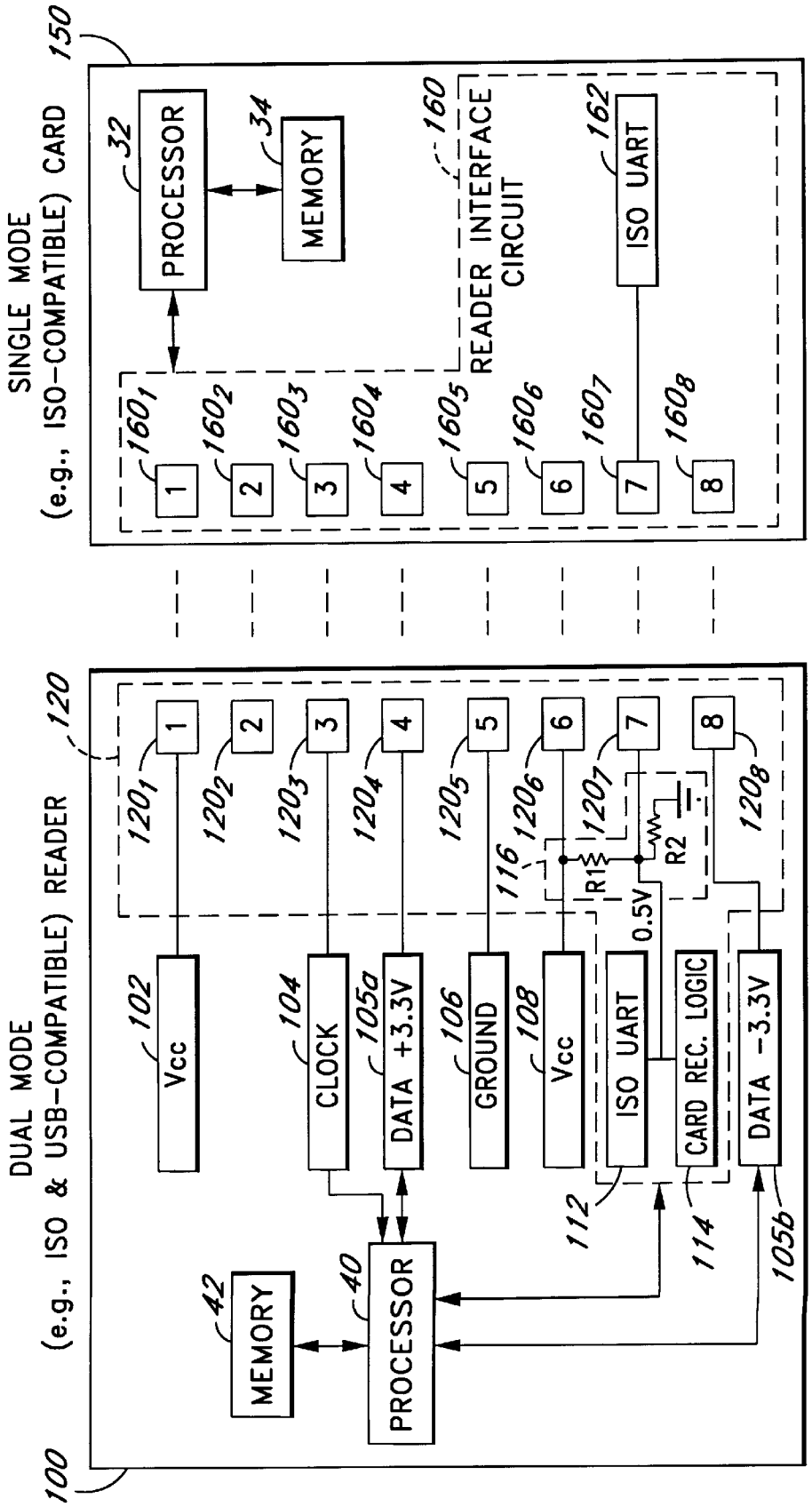
FIG. 3A illustrates one embodiment of a dual mode (e.g., ISO and USB-compatible) reader that receives one embodiment of a single mode (e.g., ISO-compatible) card.
Figure 3B:
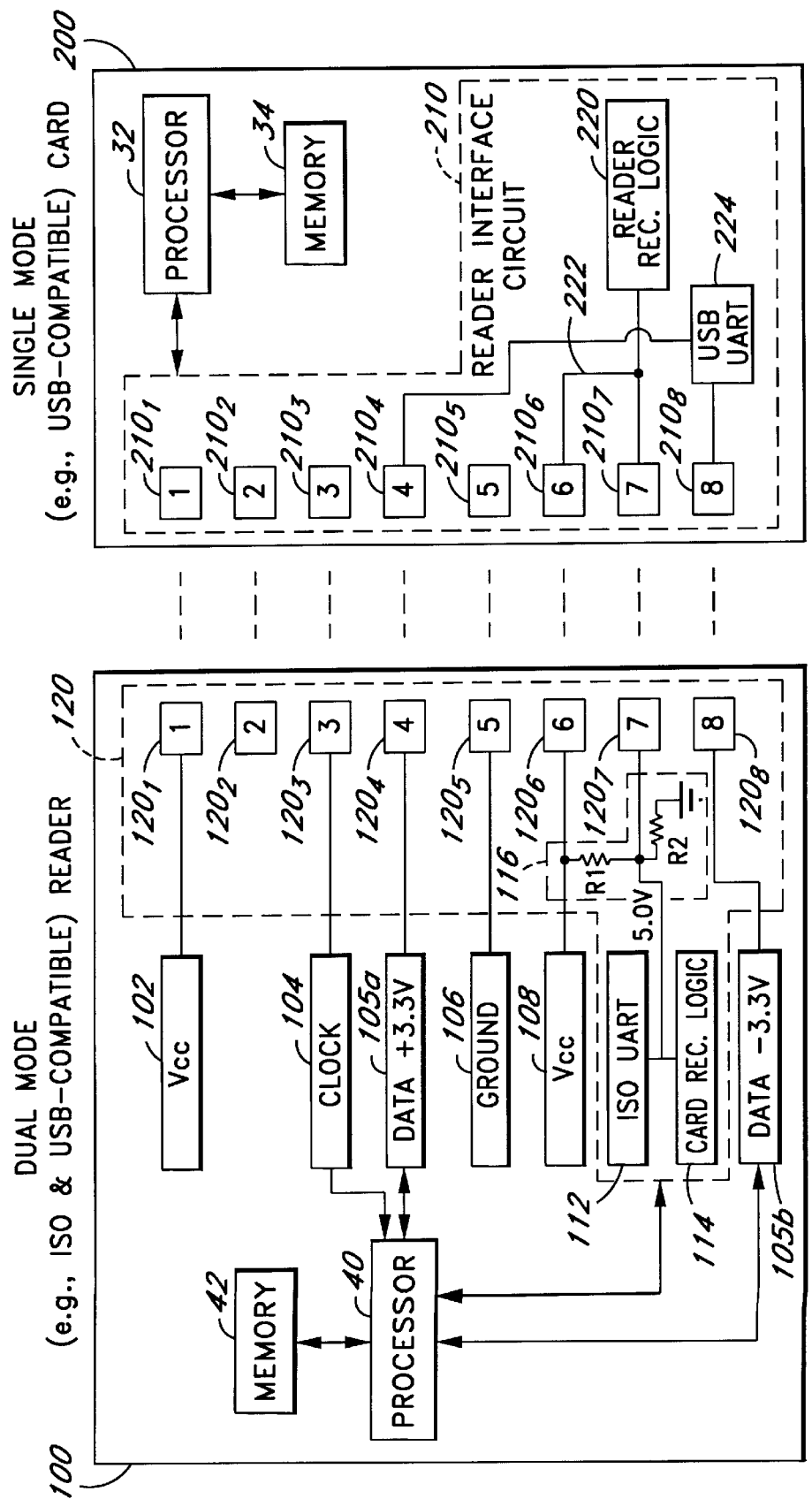
FIG. 3B illustrates one embodiment of a dual mode (e.g., ISO and USB-compatible) reader that receives one embodiment of a single mode (e.g., USB-compatible) card.
Figure 3C:
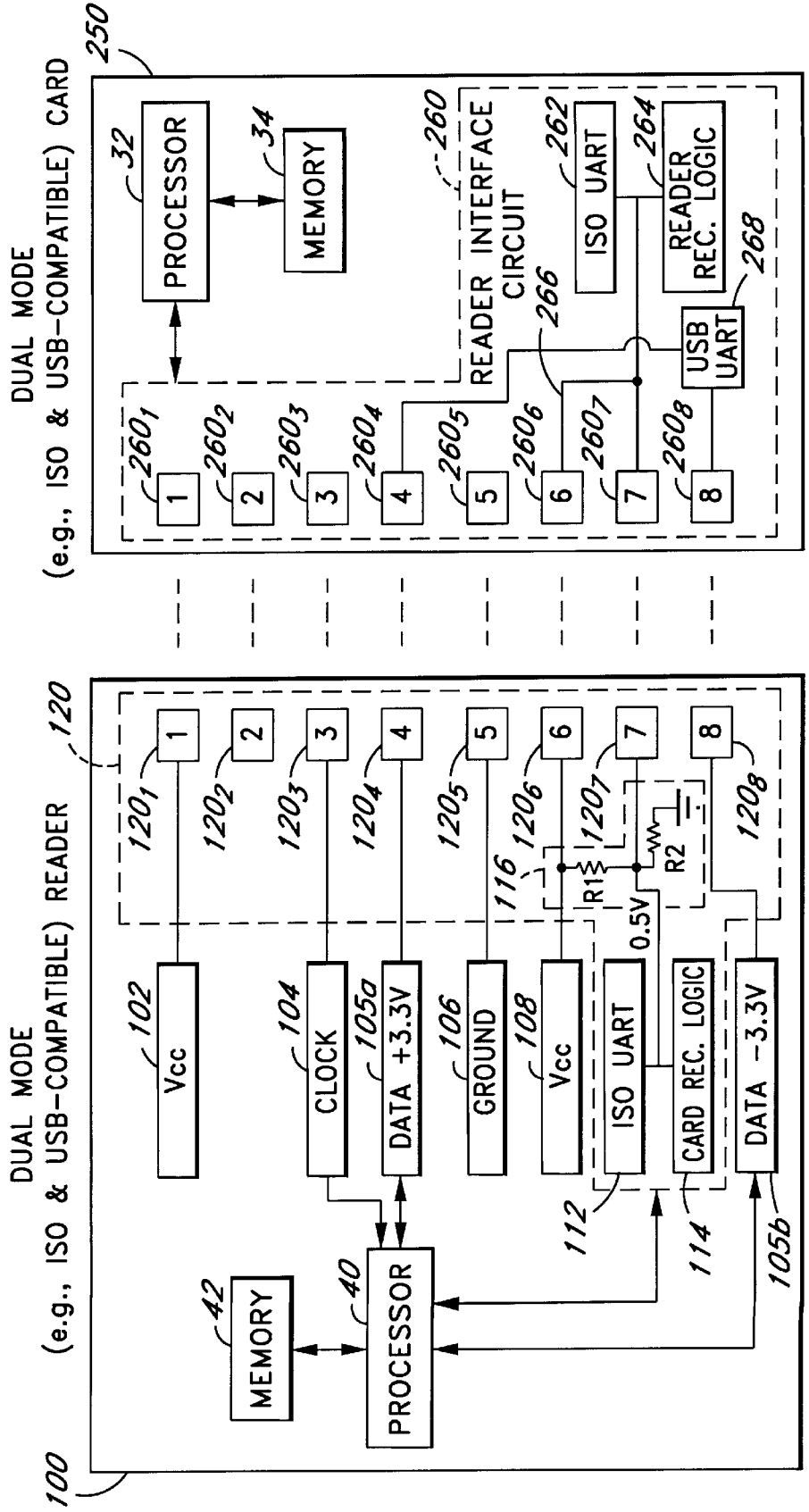
FIG. 3C illustrates one embodiment of a dual mode (e.g., ISO and USB-compatible) reader that receives one embodiment of a dual mode (e.g., ISO and USB-compatible) card.

FIGS. 3A–3C are a schematic diagrams of one embodiment of a dual mode reader 100 that may receive any one of: a single mode (e.g., ISO-compatible) card 150 (FIG. 3A), a single mode (e.g., USB-compatible) card 200 (FIG. 3B) and a dual mode (e.g., ISO and USB-compatible) card 250, in accordance with the principles of the present invention.

In one embodiment, the dual mode reader 100 operates in accordance with either of the ISO or the USB standards. The dual mode reader 100 may be used in place of the reader 20 in FIGS. 1A and 1B, while the cards 150, 200 or 250 may be used in place of the card 30 of FIGS. 1A and 1B. The dual mode reader 100 may receive any one of the cards 150, 200 or 250 through a slot (not shown) similar to the slot 22 on reader 20 of FIG. 1A. Like the card reader 20, the dual mode reader 100 comprises a processor 40, a memory module 44, a clock module 104 and a card interface circuit 120. The processor 40, memory module 44, and clock module 104 of the dual mode reader 100 may be similar or identical to those of reader 20 in FIGS. 1A and 1B. The dual mode reader 100 differs from the single mode (e.g., USB-compatible) reader 50 of FIG. 2A, in that it additionally comprises an ISO UART circuit 112. The ISO UART circuit 112 facilitates communication with an ISO-compatible card, such as card 150. Communication with a USB-compatible card (where applicable, for example, with card 200 (FIG. 3B) or card 250 (FIG. 3C)) is provided via data circuits 105a and 105b. In FIGS. 3B and 3C, communication with USB-compatible cards are provided via circuits 105a and 105b, USB UART 224 or 226, processor 32 and firmware installed in memory 34. Once communication with a USB-compatible card is established, the processor 40 of reader 100 enters a passive mode, so that direct communication between the card 150 and the host computer may occur.

A detailed description of the reader 100 and cards 150, 200 and 250 will now be provided. As shown in FIG. 3A, the card interface circuit 120 of reader 100 comprises a plurality of contact terminals $120_1$–$120_8$, an ISO UART circuit 112, a card recognition logic circuit 114 and a divider circuit 116. In one embodiment, the divider circuit 116 comprises two resistors R1 and R2. In one further embodiment, the resistance value of R1 is approximately ten times the resistance value of R2. For example, R1=100 Kohm and R2=10 Kohm. The plurality of terminals $120_1$–$120_8$ are configured to interface with a corresponding plurality of terminals $160_1$–$160_8$ located in the reader interface circuit 160 of the card 150. In one embodiment, upon insertion of the card 150 into the slot of the reader 100, the first through eighth terminals $120_1$–$120_8$ of the reader 100 interface with the first through eighth terminals $160_1$–$160_8$ of the card 150. In one embodiment, the plurality of terminals $120_1$–$120_8$ and the plurality of terminals $160_1$–$160_8$ are contact terminals.

The dual mode reader 100 further comprises a first voltage circuit 102, a first data circuit 105a, a second data circuit 105b, a ground terminal 106, and a second voltage circuit Vcc 108. In one embodiment, the first voltage circuit 102 provides a fixed voltage Vcc of 5 volts to the first terminal $120_1$. In one embodiment, the terminal $120_2$ of the reader 100, is not coupled to any circuitry. The clock circuit 104 provides clock signals to the processor 40 and to the card 150 via the third terminal $120_3$. The first and second data circuits 105a and 105b are coupled to both the processor 40 and to the fourth and eighth terminals $120_4$ and $120_8$ respectively. The first and second data circuits 105a and 105b receive and forward data via the fourth terminal $120_4$ and the eighth terminal $120_8$ when the received card is determined to be USB-compatible. Data is provided from card 150 via elements $160_7$ and $120_7$ to reader 100 and vice-versa, when the card 150 is determined to be ISO-compatible. The ground circuit 106 provides grounding via the fifth terminal $120_5$, while the second voltage circuit 108 provides a fixed voltage Vcc that is provided via a sixth terminal $120_6$. In one embodiment, the first and second voltage circuits 102 and 108 are a single voltage circuit. The ISO UART circuit 112 and the card recognition logic circuit 114 are coupled to the seventh terminal $120_7$. In addition, the divider circuit 116 is coupled to the second voltage circuit 108, the card recognition circuit 114, the sixth and seventh contact terminals $120_6$ and $120_7$. In particular, a first resistor R1 is coupled between the sixth and seventh terminals $120_6$ and $120_7$, while one end of a second resistor R2 is coupled to the seventh terminal $120_7$, and a second end of R2 is coupled to ground.

In particular, FIG. 3A illustrates one embodiment of a dual mode reader 100 that receives one embodiment of a single mode (e.g., ISO-compatible) card 150. The card 150 comprises a processor 32 that is coupled to a memory module 34 and a reader interface circuit 160. The reader interface circuit 160 comprises a plurality of terminals $160_1$–$160_8$ and an ISO UART 162. The terminals $160_1$–$160_6$ and $160_8$ are coupled to various circuitry within the card 160 which are known to one of skill in the art, but are not pertinent to the understanding of the present invention. The ISO UART 162 is coupled to the seventh terminal $160_7$.

Upon receiving the single mode (ISO-compatible) card 150, the first through eighth terminals $160_1$–$160_8$ of the card 150 contact the first through eighth terminals $120_1$–$120_8$ of the reader 100 respectively. Since the sixth terminal $160_6$ is not coupled to the seventh terminal $160_7$ of the card 150, the voltage across R1 is approximately 4.55V, while the voltage across R2 is approximately 0.45V. The card recognition logic circuit 114 in the dual mode reader 100 subsequently detects that the voltage at the seventh terminal $120_7$ of the reader 100 is at approximately 0.45V, or, is at a logic zero state, and accordingly determines that the inserted card operates in accordance with a second predetermined communication mode. In one embodiment, when card recognition logic circuit 112 detects that the seventh terminal $120_7$ is at a logic zero state, it determines that the card is ISO-compatible; i.e., the second predetermined communication mode is an ISO communication mode. The reader 100 then issues a signal for the card 150 to initialize itself as an ISO compatible card. Subsequently, the processor 40 of the reader 100 connects to the host computer e.g., computer 12, on behalf of the card 150. Upon establishing a connection with the host computer, the reader 100 proceeds to communicate with the host computer and relays commands and/or data from the host computer to the card 150 and vice versa.

FIG. 3B illustrates one embodiment of a dual mode reader 100 that receives one embodiment of a single mode (e.g., USB compatible card) 200. In one embodiment, the single mode card 200 is substantially identical to the single mode (USB compatible) card 80 of FIG. 2A, and comprises a processor 32, a memory 34, and a reader interface circuit 210. The reader interface circuit 210 comprises a plurality of terminals $210_1$–$210_8$ and a reader recognition logic circuit 220. The card 200 further comprises a USB UART 224, which is coupled to terminals $210_4$ and $210_8$. The plurality of terminals $210_1$–$210_8$ are configured to interface with the terminals $120_1$–$120_8$ when the card 200 is inserted into the reader 100.

Upon receiving the single mode (e.g., USB-compatible) card 200, the first through eighth terminals $210_1$–$210_8$ of the card 200 contact the first through eighth terminals $120_1$–$120_8$ of the reader 100 respectively. In particular, the sixth and seventh terminals $210_6$ and $210_7$ of the card 200 contact the sixth and seventh terminals $120_6$ and $120_7$ of the reader 100 respectively, so that the signal line 222 coupled between the sixth and seventh contact elements $210_6$ and $210_7$ of the card 200 creates a short between the sixth and seventh terminals $120_6$ and $120_7$ of the reader 100. As a result, the seventh terminal $120_7$ of the reader 100 is pulled up to Vcc. The card recognition logic circuit 114 in the dual mode reader 100 subsequently detects that the voltage at the seventh terminal $120_7$ of the reader 100 has been pulled up to Vcc (typically 5V) or, is at a logic one state, and accordingly determines that the inserted card operates in accordance with a first predetermined communication mode. In one embodiment, when card recognition logic circuit 114 detects that the seventh terminal $120_7$ is at a logic one state, it determines that the card 200 is USB compatible, i.e., the first predetermined communication mode is the USB mode. The reader 100 then enters a passive mode to enable the card 200 to communicate directly with the host computer.

Likewise, the reader recognition logic circuit 220 in the single mode card 200 determines that the reader 100 operates in accordance with the first predetermined communication mode (e.g., is USB compatible), by detecting a logic one at terminal $210_7$.

FIG. 3C illustrates one embodiment of a dual mode reader 100 that receives one embodiment of a dual mode card 250. In one embodiment, the dual mode is compatible with either or both the ISO and USB standards. In addition, in one embodiment, the dual mode card 250 is identical to the single mode (e.g., USB-compatible) card 200, with the exception that it further comprises an ISO UART circuit 262 that is coupled to the card recognition logic circuit 264 and terminal $260_7$. In particular, the dual mode card 250 comprises a processor 32, a memory 34, and a reader interface circuit 260. The reader interface circuit 260 comprises a plurality of terminals $260_1$–$260_8$, an ISO UART circuit 262, a reader recognition logic circuit 264 and a USB UART circuit 268. The plurality of terminals $260_1$–$260_8$ are configured to interface with the terminals $120_1$–$120_8$ when the card 250 is inserted into the reader 100.

In one embodiment, while the dual mode card 250 can operate in accordance with either of the ISO or USB standards, upon detection that a reader is USB compatible (such as reader 50) or is a dual mode reader (such as reader 100), the dual mode card 250 defaults to operate in accordance with the USB standard, which facilitates direct communication with a host computer.

Upon receiving the dual mode card 250 by the dual mode reader 100, first through eighth terminals $260_1$–$260_8$ of the card contact the first through eighth terminals $120_1$–$120_8$ of the reader 100. In particular, the sixth and seventh terminals $250_6$ and $250_7$ of the card contact the sixth and seventh terminals $120_6$ and $120_7$ of the reader 100 respectively, so that the signal line 266 coupled between the sixth and seventh terminals $260_6$ and $260_7$ creates a short between the sixth and seventh terminals $120_6$ and $120_7$. As a result, the seventh terminal $120_7$ is pulled up to Vcc. The card recognition logic circuit 114 in the dual mode reader 100 subsequently detects that the voltage at the seventh terminal $120_7$ has been pulled up to Vcc or, is at a logic one state, and accordingly detects that the inserted card is USB compatible. The reader 100 then enters a passive mode to enable the card 250 to communicate directly with the host computer.

Likewise, the reader recognition logic circuit 264 in the dual mode card 250 detects that the reader 100 is USB compatible by detecting a logic one at contact element $260_7$.

Figure 4A:
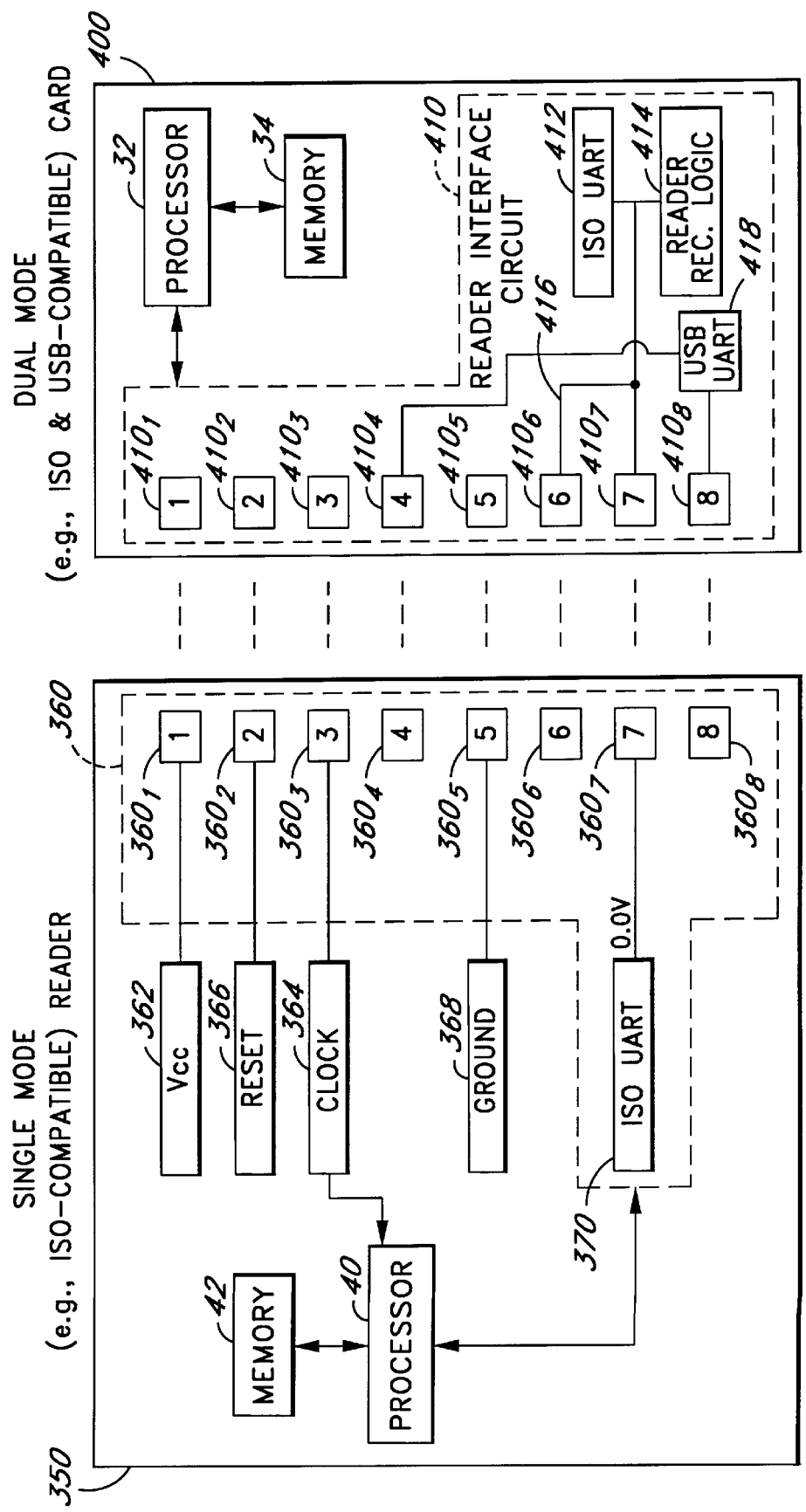
FIG. 4A illustrates one embodiment of a single mode (e.g., ISO-compatible) reader that is coupled to receive one embodiment of a dual mode (e.g., ISO and USB-compatible) card.
Figure 4B:
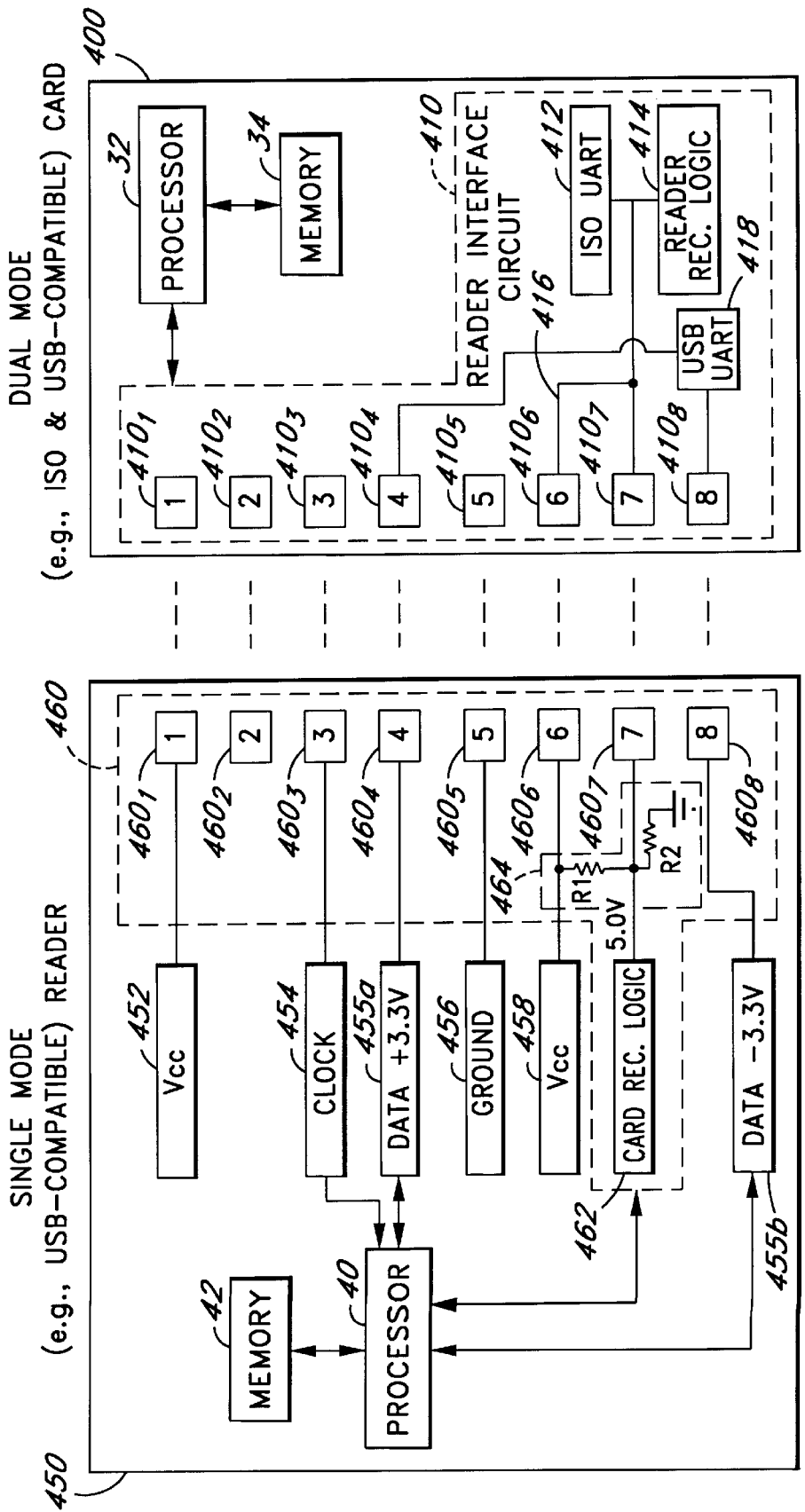
FIG. 4B illustrates a single mode (e.g., USB-compatible reader) that is coupled to receive one embodiment of a dual mode (e.g., ISO and USB-compatible) card.
Figure 4C:
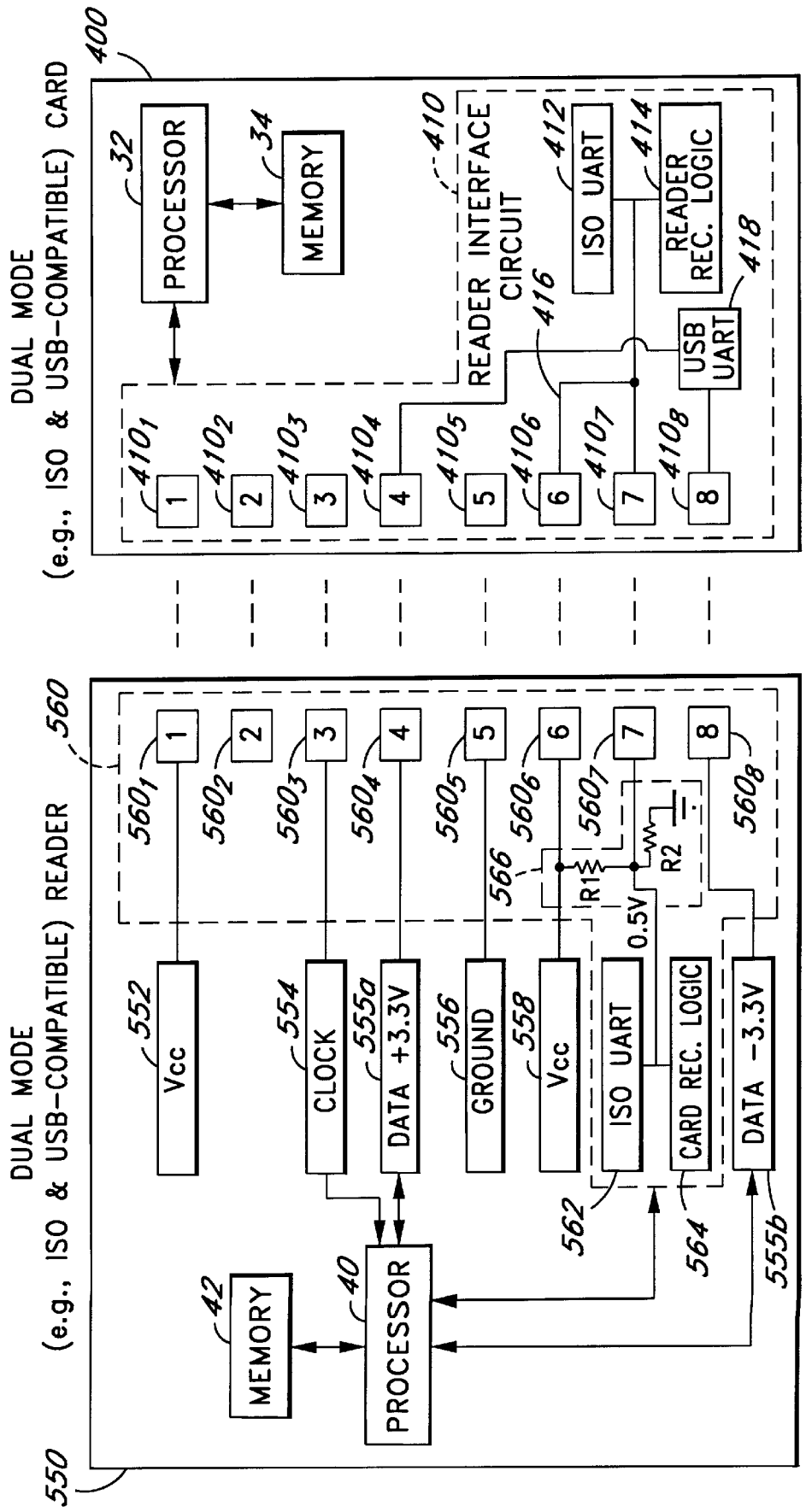
FIG. 4C illustrates a dual mode (e.g., ISO and USB-compatible) reader that is coupled to receive one embodiment of a dual mode (e.g., ISO and USB compatible) card.

FIGS. 4A–4C illustrate a block diagram of one embodiment of a dual mode card 400 that may operate with any one of: a single mode (e.g., ISO compatible) reader 350 (FIG. 3A), a single mode (e.g., USB-compatible) reader 450 (FIG. 4B) and a dual mode (e.g., ISO and USB-compatible) reader 550 (FIG. 4C).

In one embodiment, the dual mode card 400 operates in accordance with either of the ISO or the USB standards. The dual mode card 400 may be used in place of the card 30 in FIGS. 1A and 1B, while the readers 350, 450 and 550 may be used in place of the reader 20 of FIGS. 1A and 1B. The dual mode card 400 may be inserted into any one of the readers 350, 450, 550 through a slot (not shown) similar to the slot 22 on reader 20 of FIG. 1A. Like the card 30, the dual mode card 400 comprises a processor 40, a memory module 44, and a reader interface circuit 410. The processor 40 and memory module 44 of the dual mode card 400 may be similar or identical to those of reader 20 in FIGS. 1A and 1B. In one embodiment, the card 400 is identical to the card 250 (FIG. 3C).

The reader interface circuit 410 comprises a plurality of terminals $410_1$–$410_8$, an ISO UART circuit 412, a reader recognition logic circuit 414 and a USB UART circuit 418. As shown in FIG. 4A, the plurality of terminals $410_1$–$410_8$ of the card 400 are configured to interface with a plurality of terminals $360_1$–$360_8$ located in a single mode (e.g., ISO compatible) reader 350. The dual mode card mode 400 includes an ISO UART circuit 412, which facilitates communication with an ISO-compatible only reader. Communication with a USB-compatible reader is also possible through firmware installed in memory 34 of card 400 via USB UART 418.

A detailed description of the card 400 and readers 35, 450 and 550 will now be provided. In particular, FIG. 4A illustrates one embodiment of a single mode (e.g., ISO-compatible reader) 350 that is coupled to receive one embodiment of a dual mode (e.g., ISO and USB compatible) card 400, in accordance with the principles of the present invention. The single mode (ISO compatible) reader 350 is configured to operate in accordance with the ISO standard and comprises a processor 40, memory 42, a clock 364 and a card interface circuit 360. The card interface circuit 360 comprises a plurality of terminals $360_1$–$360_8$ and an ISO UART circuit 370. The reader 350 further comprises a first voltage circuit 362, a reset circuit 366 and a ground circuit 368. In one embodiment, the voltage circuit 362 provides a fixed voltage Vcc of 5 volts to the first terminal $360_1$. The reset circuit 366 provides reset signals via the second terminal $360_2$. The clock circuit 364 provides clock signals to the processor 40 and to the card 400 via the third terminal $360_3$ (that interfaces with the terminal $360_3$). Data is communicated between the reader 350 and card 400 via the seventh terminal $360_7$ of the reader 350 and the seventh terminal $410_7$ of the card 400. The ISO UART circuit 370 is coupled to the seventh terminal $360_7$ and provides a communication interface between the card 400 and processor 40 of reader 350. Terminals $360_4$ and $360_8$ of reader 350 are coupled to various circuitry of the reader 350 that are not pertinent to the understanding of the present invention. In addition, terminal $360_6$ is not coupled to any other circuitry in the reader 350.

Upon being received by the single mode (ISO-compatible) reader 350, the first through eighth terminals $410_1$–$410_8$ of card 400 contact the first through eighth terminals $360_1$–$360_8$ of reader 360. In particular, the sixth and seventh terminals $410_6$ and $410_7$ of card 400 are coupled to the sixth and seventh terminals $360_6$ and $360_7$ of the reader 350. Since the sixth terminal $360_6$ of reader is uncoupled, the reader recognition logic circuit 414 detects 0V or a logic 0 state at the seventh terminal $410_7$ (which is coupled to terminal $410_6$ via signal line 416). In response, to the detected logic 0 state, the reader recognition logic circuit 414 determines that the reader 350 is operable at a second predetermined communication mode. In one embodiment, the reader recognition logic circuit 414 determines that the reader 360 is ISO compatible only, when it detects a logic 0 state at terminal $410_7$ of the card 400. The card 400 then initializes firmware in the reader 350 for ISO-compatibility, and the reader 350 issues a signal for the card 400 to initialize itself as an ISO-compatible card.

FIG. 4B illustrates a single mode (e.g., USB-compatible reader) 450 that is coupled to receive one embodiment of a dual mode (e.g., ISO and USB compatible) card 400, in accordance with the principles of the present invention. The single mode (e.g., USB compatible) reader 450 is identical to the single mode (e.g., USB-compatible) reader 50 of FIG. 2A. The single mode reader 50 comprises a processor 40, a memory module 44, a clock module 454 and a card interface circuit 460.

Upon receiving the dual mode card 400, the first through eighth terminals $410_1$–$410_8$ of the card 400 contact the first through eighth terminals $460_1$–$460_8$ of the reader 450, respectively. In particular, the sixth and seventh terminals $410_6$ and $410_7$ of the card 400 contact the sixth and seventh terminals $460_6$ and $460_7$ of the reader 450 respectively, so that the signal line 416 coupled between the sixth and seventh terminals $410_6$ and $410_7$ of the card 400 creates a short between the sixth and seventh terminals $460_6$ and $460_7$ of the reader 450. As a result, the seventh terminal $460_7$ of the reader 460 and thus, the seventh terminal $410_7$ of the card 400, are pulled up to Vcc. The reader recognition logic circuit 414 in the dual mode card 400 subsequently detects that the voltage at the seventh terminal 400₇ of the card 400 has been pulled up to Vcc (typically 5V) or, is at a logic one state, and accordingly detects that the inserted card operates in accordance with a first predetermined communication mode. In one embodiment, the reader recognition logic circuit 414 in the single mode card 400 detects that the reader 450 is USB compatible. The card 400 then initializes firmware in the reader 450 for USB compatibility and proceeds with normal operation. Where USB compatibility is established, the reader 450 enters a passive mode and enables the card 450 to communicate directly with the host computer. Likewise, card recognition logic circuit 462 in the reader 450 determines that the card 400 is USB compatible, by detecting a logic one at terminal 460₇.

FIG. 4C illustrates one embodiment of a dual mode reader 550 that is coupled to receive one embodiment of a dual mode card 400, in accordance with the principles of the present invention. The dual mode reader 550 is identical to the dual mode reader 100 of FIGS. 3A, 3B and 3C. In one embodiment, the dual mode reader operates in accordance with either or both the ISO and USB standards.

Upon being received by the dual mode reader 550, the first through eighth terminals 410₁–410₈ of the card 400 contact the first through eighth terminals 560₁–560₈ of the card 550. In particular, the sixth and seventh terminals 400₆ and 400₇ of the dual mode card 400 contact the sixth and seventh terminals 550₆ and 550₇ of the reader 550 respectively, so that the signal line 416 coupled between the sixth and seventh terminals 400₆ and 400₇ of the card 400 creates a short between the sixth and seventh terminals 550₆ and 550₇ of the reader 550. As a result, the seventh terminal 550₇ and thus, the seventh terminal 400₇, are pulled up to Vcc. The reader recognition logic circuit 404 in the dual mode card 400 subsequently detects that the voltage at the seventh terminal 400₇ of the card 400 has been pulled up to Vcc. (typically 5V) or, is at a logic one state, and accordingly detects that the inserted card operates in accordance with a first predetermined communication mode. In one embodiment, the reader recognition logic circuit 404 in the single mode card 400 detects that the reader 450 is USB compatible. The card 400 then initializes firmware in the reader 550 for USB compatibility and proceeds with normal operation. Where USB compatibility is established, the reader 550 enters a passive mode and enables the card 450 to communicate directly with the host computer. Likewise, card recognition logic circuit 564 in the reader 550 determines that the card 400 is USB compatible, by detecting a logic one at terminal 560₇.

Figure 5:
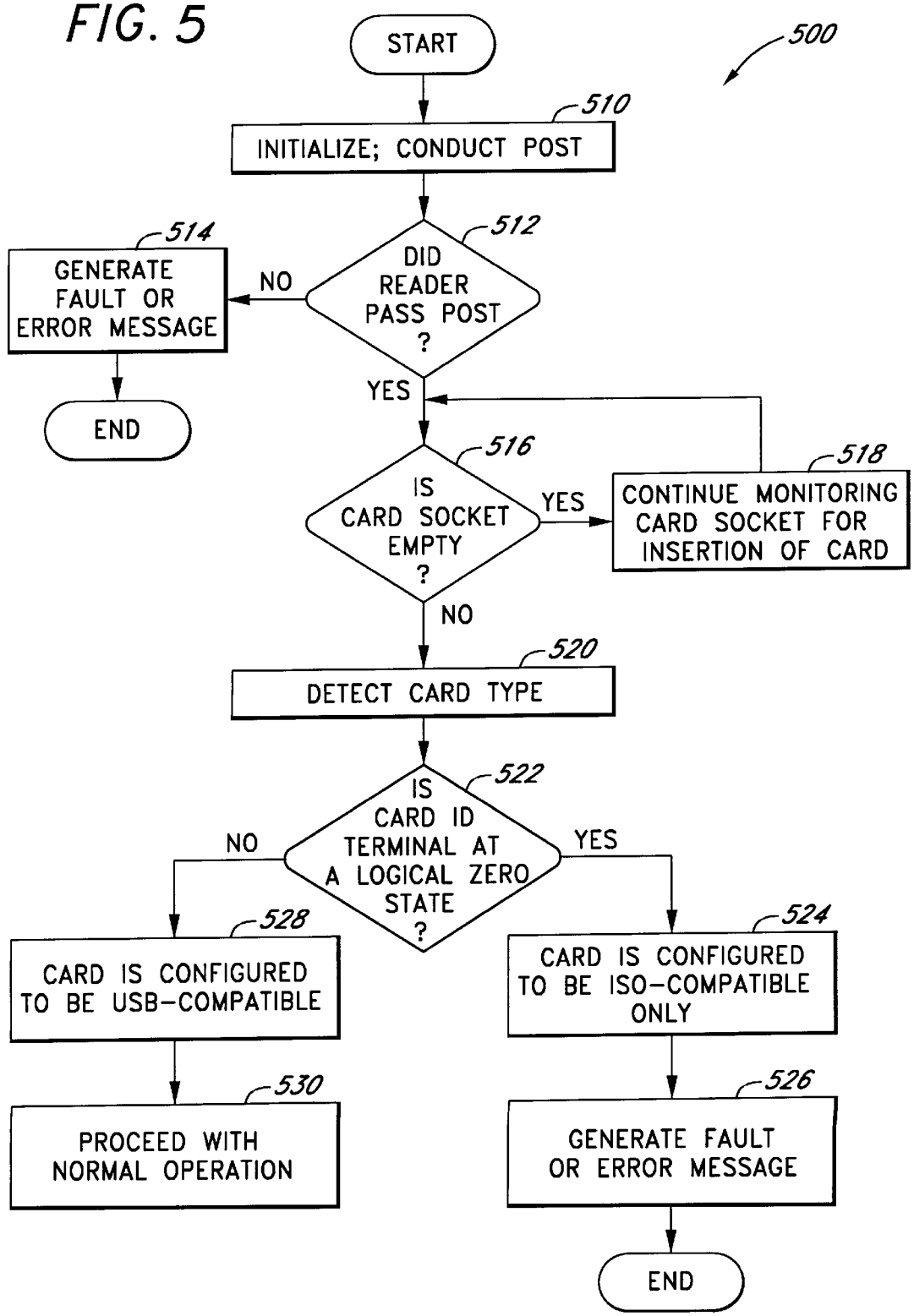
FIG. 5 is a flow chart illustrating one embodiment of the card identification process of the single mode (e.g., USB-compatible) reader in accordance with the present invention.

FIG. 5 is a flow chart that illustrates one embodiment of the card identification process of the single mode (USB-compatible) reader in accordance with one embodiment of the present invention. Beginning from a start state, the process 500 proceeds process block 510 where it initializes the single mode (USB-compatible) reader, e.g., reader 50 (FIG. 2A), and conducts a power on self test (POST). The process 500 then advances to decision block 512, where the process determines if the reader passed POST. If not, the process 500 proceeds to process block 514, where it generates a fault or an error message. The process 500 then terminates. If however, the reader passed POST, the process 500 proceeds to decision block 516, where it determines if the card socket within the slot, e.g., slot 22 (FIG. 1A) is empty. If so, the process 500 continues monitoring the card socket for the insertion of a card (process block 518). The process 500 then returns to decision block 516.

If, however, the socket is not empty, the process 500 proceeds to process block 520, where it determines the type of card inserted into the socket. In particular, the reader determines if the card is USB compatible or ISO compatible. To do so, the process advances to decision block 522, where it determines if its card identification terminal e.g., the seventh terminal 60₇ of reader 50 (FIG. 2A), is at or approximately zero volts, or at a logical zero state. If so, the process 500 determines that the card is configured as an ISO-compatible card (process block 524). The process 500 subsequently generates a fault or an error message (process block 526) and then terminates. If the card identification terminal e.g., the seventh terminal 60₇ of reader 50 (FIG. 2A), is not at a logical zero state, the process 500 determines that the card is configured as a USB-compatible (process block 528). In one embodiment, the process 500 determines that the card is USB-compatible if the card identification terminal e.g., the seventh terminal 60₇ of reader 50 (FIG. 2A), is at a logical one state, i.e., at or approximately at 5 volts. The process 500 then proceeds with normal operation, including reading and writing of data to and from the card, e.g., card 80, as shown in process block 530.

Figure 6:
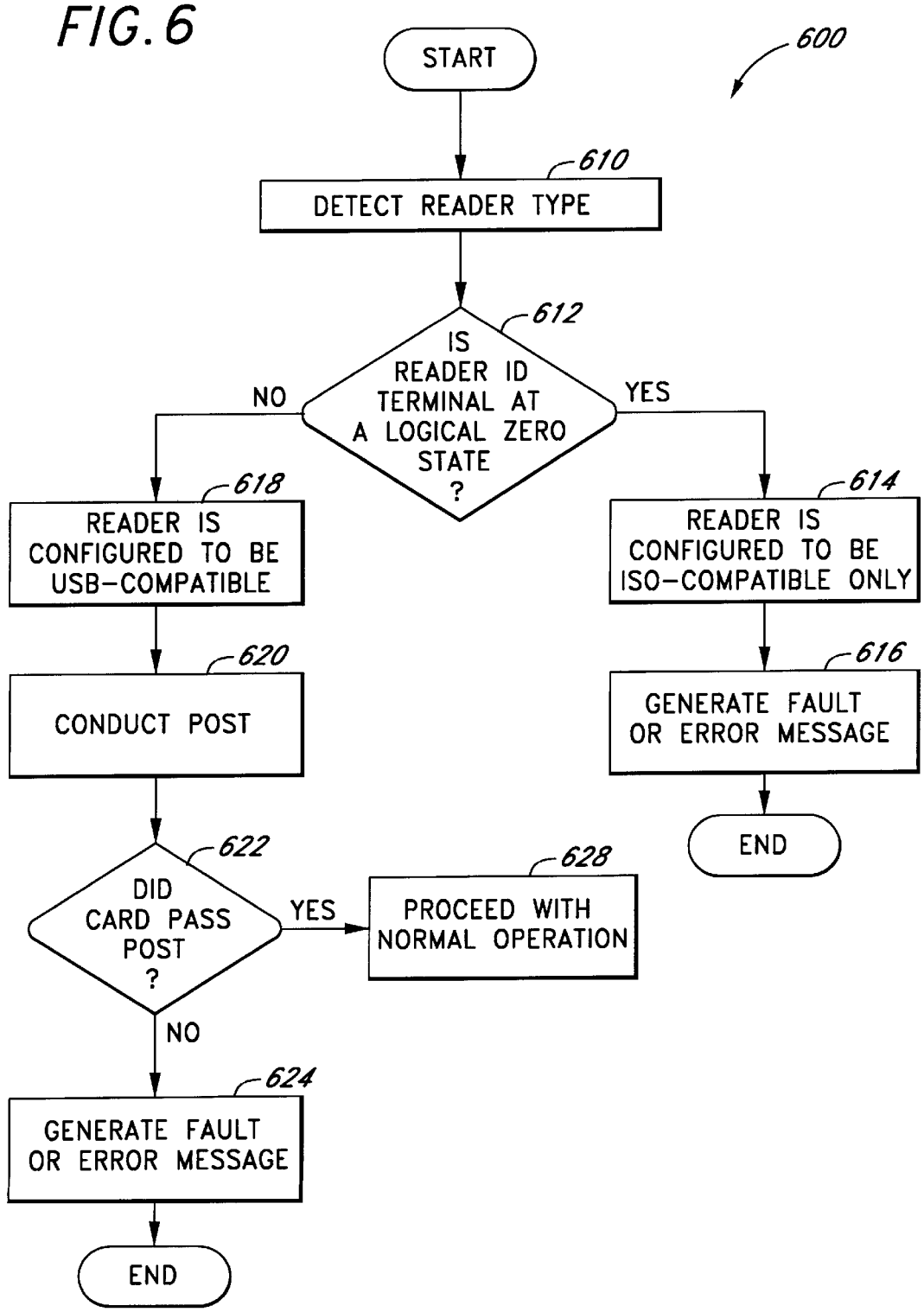
FIG. 6 is a flow chart illustrating one embodiment of the reader identification process of the single mode (e.g., USB-compatible) card in accordance with the present invention.

FIG. 6 is a flow chart that illustrates the reader identification process of the single mode (USB-compatible) card in accordance with one embodiment of the present invention. The process 600 begins from a start state and proceeds to process block 610, where it determines the type of reader the card, e.g., card 80 of FIG. 2A, has been inserted into. The process 600 then advances to a decision block 612, where it determines if the reader identification terminal of the card e.g., terminal seven 82₇ of card 80 (FIG. 2A), is at a logical zero state, i.e., at or approximately 0 volts. If so, the process 600 determines that the reader is configured to be ISO-compatible only (process block 614), and subsequently proceeds to process block 616 to generate a fault or an error message. The process 600 then terminates.

However, if the reader identification terminal of the card e.g., terminal seven 82₇ of card 80 (FIG. 2A), is not at a logical zero state, the process 600 determines that the reader is configured as a USB-compatible reader (process block 618). In one embodiment, the process determines that the reader is USB-compatible if the reader identification terminal e.g., the seventh terminal 82₇ of card 80 (FIG. 2A), is at a logical one state, i.e., at or approximately at 5 volts. The process 600 then proceeds to process block 620, where it conducts POST for the card. It then advances to decision block 622, where it determines if the card passed POST. If not, the process 600 generates a fault or an error message, as shown in process block 624. The process 600 then terminates. However, if the card passed POST, it proceeds with normal operation, including reading of data to and from the reader.

Figure 7A:
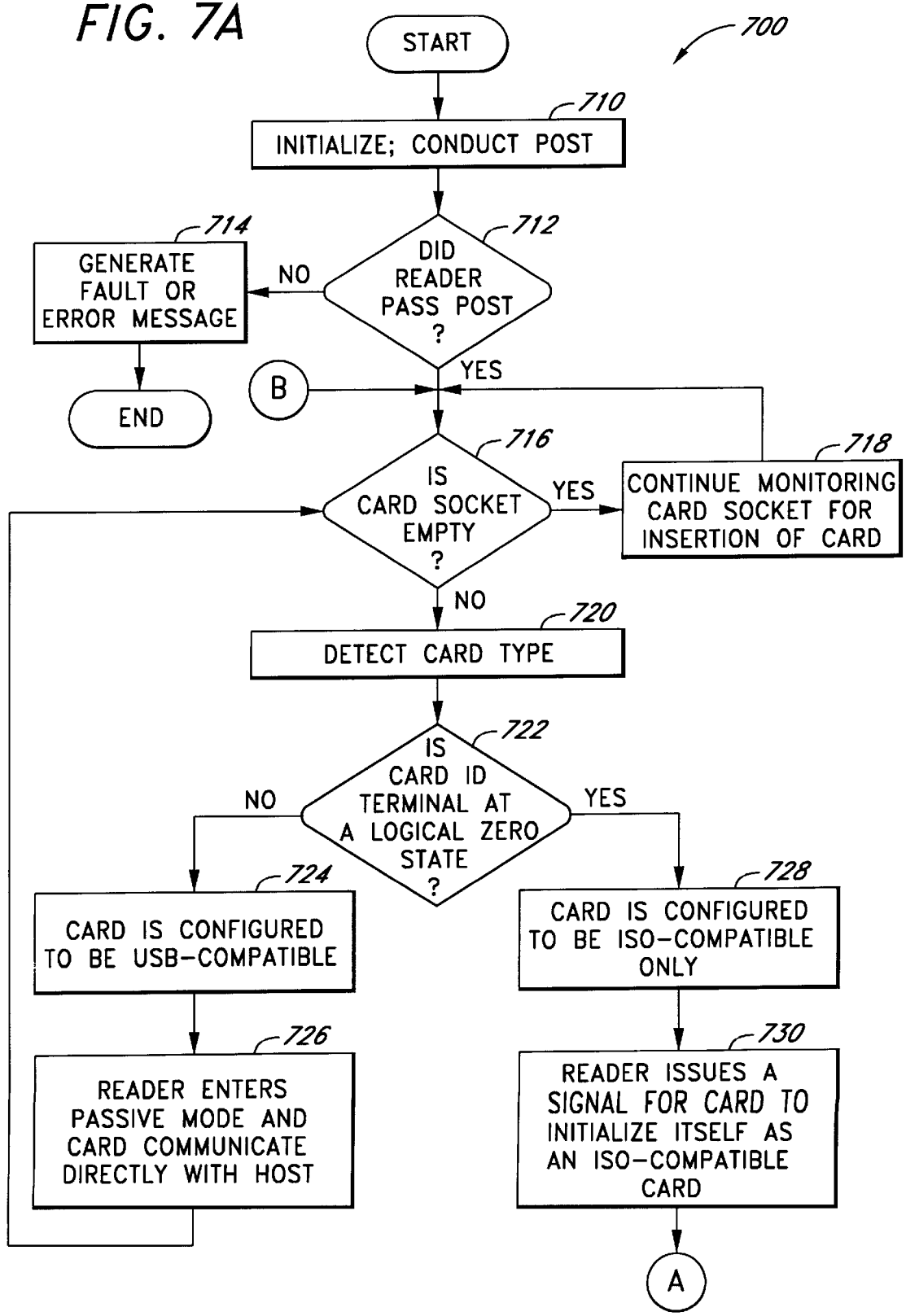
FIGS. 7A and 7B illustrate a flow chart of one embodiment of the card identification process of the dual mode reader in accordance with the present invention.
Figure 7B:
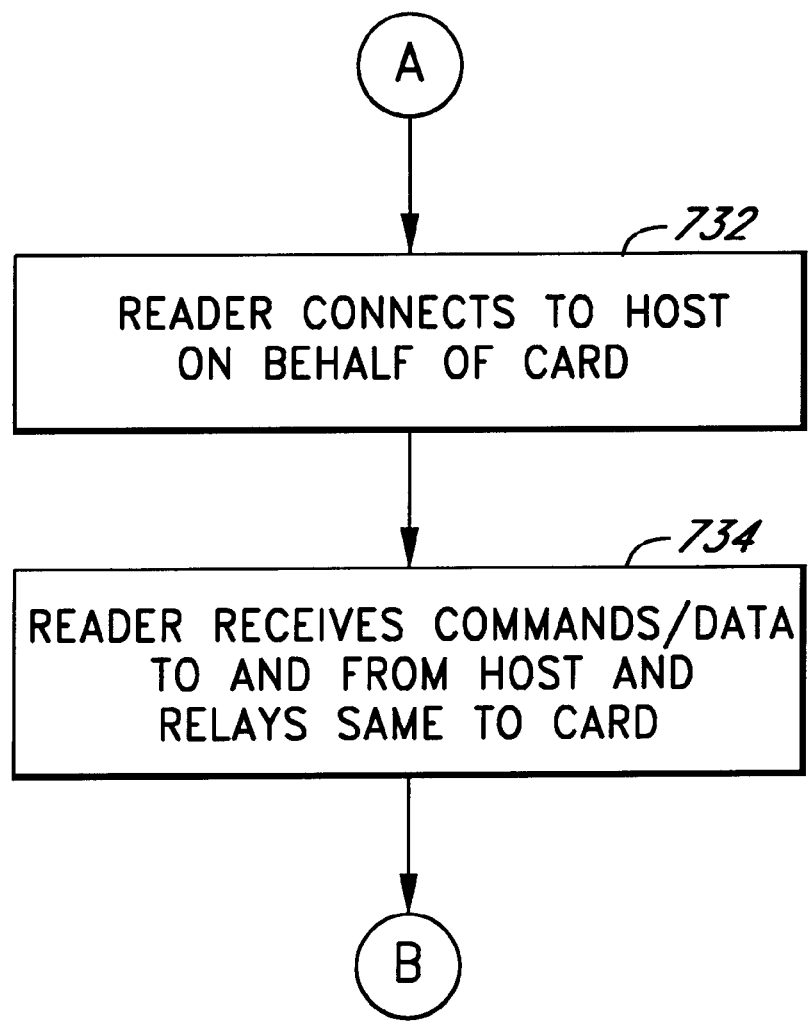

FIGS. 7A and 7B illustrate a flow chart illustrating of the card identification process of the dual mode reader in accordance with one embodiment of the present invention. Beginning from a start state, the process 700 proceeds process block 710 where it initializes the dual mode (ISO and USB-compatible) reader, e.g., reader 100 (FIGS. 3A–3C), and conducts a power on self test (POST). The process 700 then advances to decision block 712, where the process 700 determines if the reader passed POST. If not, the process 700 proceeds to process block 714, where it generates a fault or an error message. The process 700 then terminates.

If however, the reader passed POST, the process 700 proceeds to decision block 716, where it determines if the card socket within the slot, e.g., slot 22 (FIG. 1A) is empty. If so, the process 700 continues monitoring the card socket for the insertion of a card (process block 718). The process 700 then returns to decision block 716. If however, the socket is not empty, the process 700 proceeds to process block 720, where it determines the type of card inserted into the socket. In particular, the reader determines if the card is USB compatible or ISO compatible. In one embodiment, a dual mode (ISO and USB-compatible) reader defaults to USB when it detects that the card it is interfacing with is also USB compatible.

To determine the compatibility of the card, the process 700 advances to decision block 722, where it determines if its card identification terminal e.g., the seventh terminal $120_7$ of reader 100 (FIGS. 3A–3C), is at a logical zero state, i.e., at or approximately zero volts. If not, the process 700 determines that the card is configured as a USB-compatible card (process block 724). In one embodiment, the process 700 determines that the card is USB-compatible if the card identification terminal e.g., the seventh terminal $120_7$ of reader 100 (FIGS. 3A–3C), is at or approximately at 5 volts. From process block 724, the process 700 proceeds to process block 726, where it then configures the reader to enter a passive mode and enables the card to communicate directly with the host, such as a host computer. The process then returns to decision block 716.

If, at decision block 722, the process 700 determines that the card identification terminal e.g., the seventh terminal $120_7$ of reader 100 (FIGS. 3A–3C), is at a logical zero state, the process 700 determines that the card is configured only as an ISO-compatible card (process block 728). The process 700 subsequently configures the reader to issue a signal for the card to initialize itself as an ISO-compatible card, as shown in process block 730. The process 700 then proceeds to process block 732, where the reader connects to the host, such as a host computer, on behalf of the card. The process 700 then advances to process block 734, where the reader receives commands and/or data to and from the host and relays the commands and/or data to the card. The command/data relay process continues until terminated by the user or the reader, upon which the process 700 returns to decision block 716 to continue monitoring the card socket.

FIG. 8 is a flow chart illustrating one embodiment of the reader identification process of the dual mode card in accordance with one embodiment of the present invention. The process 800 begins from a start state and proceeds to process block 810, where it determines the type of reader the card, e.g., card 400 of FIGS. 4A–4C, has been inserted into. In one embodiment, if the card is both USB and ISO compatible, it defaults to USB compatibility if it determines that the reader is also USB compatible. From process block 810, the process 800 advances to decision block 812, where it determines if the reader identification terminal of the card e.g., terminal seven $410_7$ of card 400 (FIGS. 4A–4C), is at a logical zero state, i.e., at or approximately 0 volts. If not, the process 800 proceeds to process block 814, where it determines that the reader is configured to be USB-compatible. In one embodiment, the process 800 determines that the reader is USB-compatible if the reader identification terminal of the card is at or approximately 5 volts. The process 800 then proceeds to initialize the reader firmware for USB compatibility. If however, at decision block 812, the reader identification terminal of the card e.g., terminal seven $410_7$ of card 400 (FIGS. 4A–4C), is at a logical zero state, the process 800 determines that the reader is configured only to be ISO-compatible (process block 818). In this case, the process 800 proceeds to process block 820, where it initializes the reader firmware for ISO-compatibility. The process 800 then proceeds to process block 822, where the reader issues a signal for the card to initialize itself as an ISO-compatible card.

Form either of process blocks 816 or 822, the process 800 proceeds to process block 824, where it initializes the card and conducts POST. The process 800 then proceeds to decision block 826, where it queries if the card passed POST. If not, the process generates a fault or an error message, as shown in process block 828. The process 800 then terminates. However, if the card passed POST, the process 800 proceeds with normal operation, including reading of data to and from the reader, as shown in process block 830.

The present invention thus provides a card reader and/or that is capable of communicating in accordance with the either or both the ISO and USB standards, and can distinguish the operational mode of the card it receives and/or the reader it is received within. Such a card reader and/or card provides greater flexibility of interfacing with a respective card and/or reader. In addition, by providing communication in accordance with the USB standard, a card can communicate directly with a host computer, without the need for separate drivers for the reader and the card.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A dual mode card reader, comprising:
   a memory:
   a card interface circuit that detects a mode of a card, the mode being one of first and second communication modes, the card interface circuit comprising a voltage divider having first and second terminals, the first terminal being connected to a voltage source, the voltage divider comprising first and second resistors, the first resistor being coupled between the first and the second terminals, the second resistor being coupled between the second terminal and a ground terminal, wherein a voltage across the first resistor has a first value corresponding to a logical one state, when the detected mode is the first communications mode; and
   a processor coupled to the card interface circuit and the memory, the processor communicating with the card in the detected mode.

2. The card reader of claim 1, wherein the first communication mode is a universal serial bus communication protocol.

3. The card reader of claim 1, wherein the voltage across the first resistor has a second value when the detected mode is the second communication mode.

4. The card reader of claim 3, wherein the second value corresponds to a logical zero state.

5. The card reader of claim 4, wherein the second communication mode is an ISO communication protocol.

6. The card reader of claim 3, further comprising a communication interface circuit coupled to the voltage divider, the communication interface circuit being configured to interface with the card in the second communication mode.

7. The card reader of claim 1, further comprising a card recognition logic circuit that is coupled to the voltage divider.

8. A card reader, comprising:
   a memory;

a card interface circuit that detects a mode of a card, the card interface circuit comprising a voltage divider having first and second terminals, the first terminal being connected to a voltage source, the voltage divider comprising a first and a second resistor, the first resistor being coupled between the first and the second terminals, the second resistor being coupled between the second terminal and a ground terminal, wherein a voltage across the first resistor has a first value corresponding to a logical one state, when the detected mode is the communication mode of the processor; and a processor coupled to the card interface circuit and the memory, the processor communicating with the card in the detected mode if the detected mode matches a communication mode of the processor.

9. The card reader of claim 8, wherein the communication mode of the processor is a universal serial bus communication protocol.

10. The card reader of claim 8, further comprising a card recognition logic circuit that is coupled to the voltage divider;

a reader interface circuit that detects a mode of a reader; and a processor coupled to the reader interface circuit and the memory, the processor communicating with the reader in the detected mode if the detected mode matches a communication mode of the processor.

11. A method of providing communication with a card, comprising:

detecting a mode of the card, the mode being one of first and second communication modes, by providing a voltage divider having first and second terminals, the first terminal being connected to a voltage source, the voltage divider comprising first and second resistors, the first resistor being coupled between the first and the second terminals, the second resistor being coupled between the second terminal and a ground terminal, recognizing a first value of a voltage across the first resistor when the detected mode is the first communication mode, the first value corresponding to a logical one state; and communicating with the card in the detected mode.

12. The method of claim 11, wherein the first communication mode is a universal serial bus communication protocol.

13. The method of claim 11, wherein detecting a mode of the card further comprises: recognizing a second value of a voltage across the first resistor when the detected mode is the second communication mode.

14. A method of providing communication with a card, comprising:

detecting a mode of the card, the mode being one of first and second communication modes, by providing a voltage divider having first and second terminals, the first terminal being connected to a voltage source, the voltage divider comprising first and second resistors, the first resistor being coupled between the first and the second terminals, the second resistor being coupled between the second terminal and a ground terminal, recognizing a second value of a voltage across the first resistor when the detected mode is the second communication mode, the second value corresponding to a logical zero state; and communicating with the card in the detected mode.

15. The method of claim 14, wherein the second communication mode is an ISO communication protocol.

16. A method of providing communication with a card reader, comprising:

detecting a mode of the reader by providing a reader recognition logic circuit that is coupled to a first and a second terminal, said first and second terminals being coupled via a signal line, providing a communication interface circuit that is coupled to the reader recognition circuit, detecting a first value at one of the first and second terminals, the mode being one of first and second communication modes, wherein the first communication mode is a universal serial bus communication protocol when the first value is at a logical one state; and communicating with the reader in the detected mode.

17. A method of providing communication with a card reader, comprising:

detecting a mode of the reader the mode being one of first and second communication modes, by providing a reader recognition logic circuit that is coupled to a first and a second terminal, said first and second terminals being coupled via a signal line, providing a communication interface circuit that is coupled to the reader recognition circuit, detecting a first value at one of the first and second terminals, detecting a second value at one of the first and second terminals, wherein the first communication mode is an ISO communication protocol when the second value is at a logical zero state; and communicating with the reader in the detected mode.

* * * * *